(12) United States Patent
Chong et al.

(10) Patent No.: US 8,218,420 B2
(45) Date of Patent: Jul. 10, 2012

(54) NON-CYCLIC EVOLVING-TYPE USER RESOURCE STRUCTURE FOR OFDMA BASED SYSTEM WITH NULL GUARD TONES

(75) Inventors: Chia-Chin Chong, Santa Clara, CA (US); Hlaing Minn, Allen, TX (US); Fujio Watanabe, Union City, CA (US)

(73) Assignee: NTT DoCoMo, Inc., Tokyo (JP)

( * ) Notice: Subject to any disclaimer, the term of this patent is extended or adjusted under 35 U.S.C. 154(b) by 381 days.

(21) Appl. No.: 12/620,422

(22) Filed: Nov. 17, 2009

(65) Prior Publication Data

US 2010/0246505 A1    Sep. 30, 2010

Related U.S. Application Data

(60) Provisional application No. 61/163,782, filed on Mar. 26, 2009, provisional application No. 61/164,192, filed on Mar. 27, 2009.

(51) Int. Cl.
  *H04W 4/00* (2009.01)
(52) U.S. Cl. ........................................ 370/203; 370/329
(58) Field of Classification Search ........................ None
  See application file for complete search history.

(56) References Cited

U.S. PATENT DOCUMENTS

| | | | |
|---|---|---|---|
| 6,917,812 B2 | 7/2005 | Damnjanovic | |
| 6,987,738 B2 | 1/2006 | Subramanian et al. | |
| 2005/0265223 A1 | 12/2005 | Song | |
| 2006/0109865 A1 | 5/2006 | Park et al. | |
| 2006/0146920 A1 | 7/2006 | Suh et al. | |
| 2007/0110003 A1 | 5/2007 | Tujkovic et al. | |
| 2007/0201398 A1 | 8/2007 | Yang et al. | |
| 2008/0002619 A1 | 1/2008 | Tujkovic et al. | |
| 2008/0043610 A1 | 2/2008 | Li et al. | |
| 2008/0076438 A1 | 3/2008 | Chang et al. | |
| 2008/0095277 A1* | 4/2008 | Cheng | 375/340 |
| 2008/0248805 A1 | 10/2008 | Han et al. | |
| 2009/0073929 A1* | 3/2009 | Malladi et al. | 370/329 |
| 2009/0190537 A1* | 7/2009 | Hwang et al. | 370/329 |

FOREIGN PATENT DOCUMENTS

WO    2007/119148    10/2007

OTHER PUBLICATIONS

PCT International Search Report for International Application No. PCT/US2010/026808 dated May 11, 2010, 2 pages.

(Continued)

*Primary Examiner* — Robert Scheibel
(74) *Attorney, Agent, or Firm* — Haynes and Boone, LLP

(57) ABSTRACT

A non-cyclic evolving-type user resource structure applicable for use in the uplink and the downlink of an OFDMA system with large null guard tones (e.g., a 3GPP LTE system) is provided. In one example, the user resource structure combines the benefits of localized and distributed types of resource structures available in the current baseline 3GPP LTE (Release 8) specifications, and is especially suitable for operating in a fast time-varying channel. In another example, the non-cyclic evolving-type resource structure may be simplified to have no more than three stages: a band-type first stage, a partially evolved-type second stage and an interleaved-type third stage. Depending upon the target or average mobile speed and packet length, the resource structure may even have less than three stages.

8 Claims, 25 Drawing Sheets

Proposed non-cyclic evolving-type resource structure for the case of 2.5 MHz channel bandwidth with up to 4 simultaneous users.

OTHER PUBLICATIONS

PCT Written Opinion of the International Searching Authority for International Application No. PCT/US2010/026808 dated May 11, 2010, 5 pages.

P. Svedman, S. K. Wilson, L. J. Cimini, and B. Ottersten, "Opportunistic beamforming and scheduling for OFDMA systems," *IEEE Trans. Commun.*, vol. 55, No. 5, May 2007, pp. 941-952.

R. Chemaly, K. Letaief, and D. Zeghlache, "Adaptive resource allocation for multiuser MIMO/OFDM networks based on partial channel state information," *Proc. IEEE Globecom 2005*, St. Louis, MO, Nov. 2005, pp. 3922-3926.

J. Oh and J. M. Cioffi, "Sub-band rate and power control for wireless OFDM systems," *Proc. IEEE Vehicular Technology Conference (VTC 2004-Fall)*, Los Angeles, CA, vol. 3, Sep. 26-29, 2004, pp. 2011-2014.

F.-S. Chu and K.-C. Chen, "Fair adaptive radio resource allocation of mobile OFDMA," *Proc. IEEE Personal, Indoor and Mobile Radio Communications (PIMRC 2006)*, Helsinki, Finland, Sep. 2006, pp. 1-5.

T. Kunihiro, T. Yamaura, M. Suzuki, E. Fujita, "BDMA testbed-configuration and performance results," *Proc. IEEE Vehicular Technology Conference, VTC Spring*, vol. 3, May 16-20, 1999, pp. 1836-1840.

P. Bisaglia, S. Pupolin, D. Veronesi, M. Gobbi, "Resource allocation and power control in a TDD OFDM-based system for 4G cellular networks," *Proc. IEEE Vehicular Technology Conference, VTC Spring*, vol. 4, May 7-10, 2006, pp. 1595-1599.

Y. Teng, K. Naito, K. Mori, H. Kobayashi, "Performances of multicarrier system with time and frequency domain spreading for wireless communications," *Proc. International Conference on Wireless Networks, Communications and Mobile Computing*, vol. 1, Jun. 13-16, 2005, pp. 558-563.

3rd Generation Partnership Project (3GPP); Technical Specification Group Radio Access Network; Evolved Universal Terrestrial Radio Access (E-UTRA); Physical Channels and Modulation (Release 8), Doc. 3GPP TR 36.211, Version 8.4.0, Sep. 2008.

X. Fu, Y. Li, and H. Minn, "A new ranging method for OFDMA systems," *IEEE Trans. on Wireless Commun.*, vol. 6, No. 2, pp. 659-669, Feb. 2007.

C.-C. Chong, H. Minn, and F. Watanabe, "An Evolving-Type User Resource Structure/Channelization with Enhanced Diversity for OFDMA Based Time-Varying Channels," Provisional Patent Application, DOCOMO No. PA-0635, Filed: Jun. 24, 2008.

Broadband Wireless Access: IEEE MAN standard, IEEE LAN/MAN Standards Committee IEEE 802.16e, 2005.

\* cited by examiner

An illustration of an OFDMA system with large null guard tones.

LTE frame structure Type 1 for FDD systems (Prior art).

LTE frame structure Type 1 for TDD systems (prior art).

LTE downlink resource grid (prior art).

FIG. 5  Parameter definitions for the proposed non-cyclic evolving-type OFDMA resource structure.

FIG. 6

Proposed non-cyclic evolving-type resource structure for the case of 2.5 MHz channel bandwidth with up to 4 simultaneous users.

FIG. 7

Proposed non-cyclic evolving-type resource structure for the case of 2.5 MHz channel bandwidth with up to 6 simultaneous users.

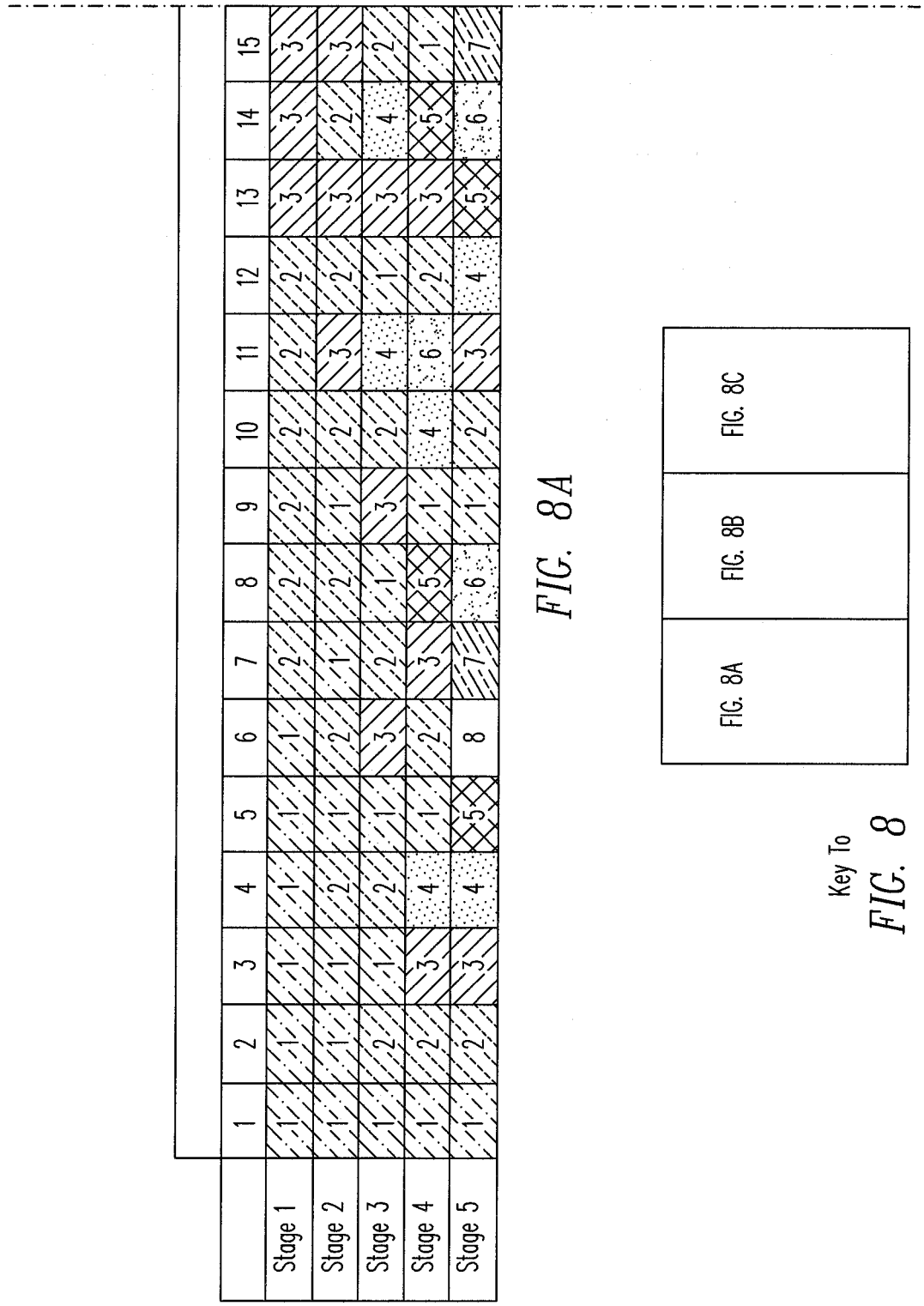

Proposed non-cyclic evolving-type resource structure for the case of 2.5 MHz and 5 MHz channel bandwith with up to 8 simultaneous users.

| | 33 | 34 | 35 | 36 | 37 | 38 | 39 | 40 | 41 | 42 | 43 | 44 | 45 | 46 | 47 | 48 |
|---|---|---|---|---|---|---|---|---|---|---|---|---|---|---|---|---|
| | 6 | 6 | 6 | 6 | 7 | 7 | 7 | 7 | 7 | 7 | 8 | 8 | 8 | 8 | 8 | 8 |
| | 5 | 6 | 7 | 6 | 7 | 6 | 7 | 8 | 7 | 8 | 7 | 8 | 7 | 8 | 8 | 8 |
| | 8 | 7 | 5 | 6 | 8 | 5 | 7 | 6 | 8 | 7 | 6 | 8 | 7 | 8 | 7 | 8 |
| | 5 | 8 | 4 | 6 | 7 | 3 | 5 | 8 | 4 | 6 | 7 | 8 | 5 | 6 | 7 | 8 |
| | 1 | 2 | 3 | 4 | 5 | 6 | 7 | 8 | 1 | 2 | 3 | 4 | 5 | 6 | 7 | 8 |

*FIG. 8C*

Key To

| FIG. 9A | FIG. 9B | FIG. 9C | FIG. 9D |

Proposed non-cyclic evolving-type resource structure for the case of 5 MHz and 10 MHz channel bandwith with up to 12 simultaneous users.

FIG. 9D

|         | 1  | 2  | 3  | 4  | 5  | 6  | 7  | 8 | 9  | 10 | 11 | 12 | 13 | 14 | 15 |
|---------|----|----|----|----|----|----|----|---|----|----|----|----|----|----|----|
| Stage 1 | 1a | 1a | 1a | 1b | 1b | 1b | 2a | 2a| 2a | 2b | 2b | 2b | 3a | 3a | 3a |
| Stage 2 | 1a | 1  | 1  | 2a | 1  | 2  | 2  | 2 | 1b | 2  | 3a | 2  | 3  | 2b | 3  |
| Stage 3 | 1a | 1  | 1  | 2  | 1  | 3a | 3  | 1 | 3  | 2  | 4a | 1  | 3  | 4  | 2  |
| Stage 4 | 1  | 2  | 3  | 4  | 1  | 2  | 3  | 5 | 1  | 4  | 6  | 2  | 3  | 5  | 1  |
| Stage 5 | 1  | 2  | 3  | 4  | 5  | 6  | 7  | 8 | 1  | 2  | 3  | 4  | 5  | 6  | 7  |

*FIG. 10A*

| FIG. 10A | FIG. 10B | FIG. 10C |
|----------|----------|----------|

Key To
*FIG. 10*

Proposed non-cyclic evolving-type resource structure for the case of 10 MHz channel bandwith with up to 16 simultaneous users.

Key To

Proposed non-cyclic evolving-type resource structure for the case of 10 MHz and 20 MHz channel bandwith with up to 24 simultaneous users.

FIG. 11D

Flowchart of the non-cyclic evolving-type user resource structure design.

Flowchart of the 3 stages simplified evolving structure design for systems with large number of null guard tones.

FIG. 14  Illustration of the resource shape of the k-th E-PRBs for all three stages where each block represents a SPRB.

FIG. 15  Illustration of the resource shape of the 1st E-PRBs for all three stages where each block represents a SPRB.

FIG. 16  Illustration of the resource shape of the U-th E-PRBs for all three stages where each block represents a SPRB.

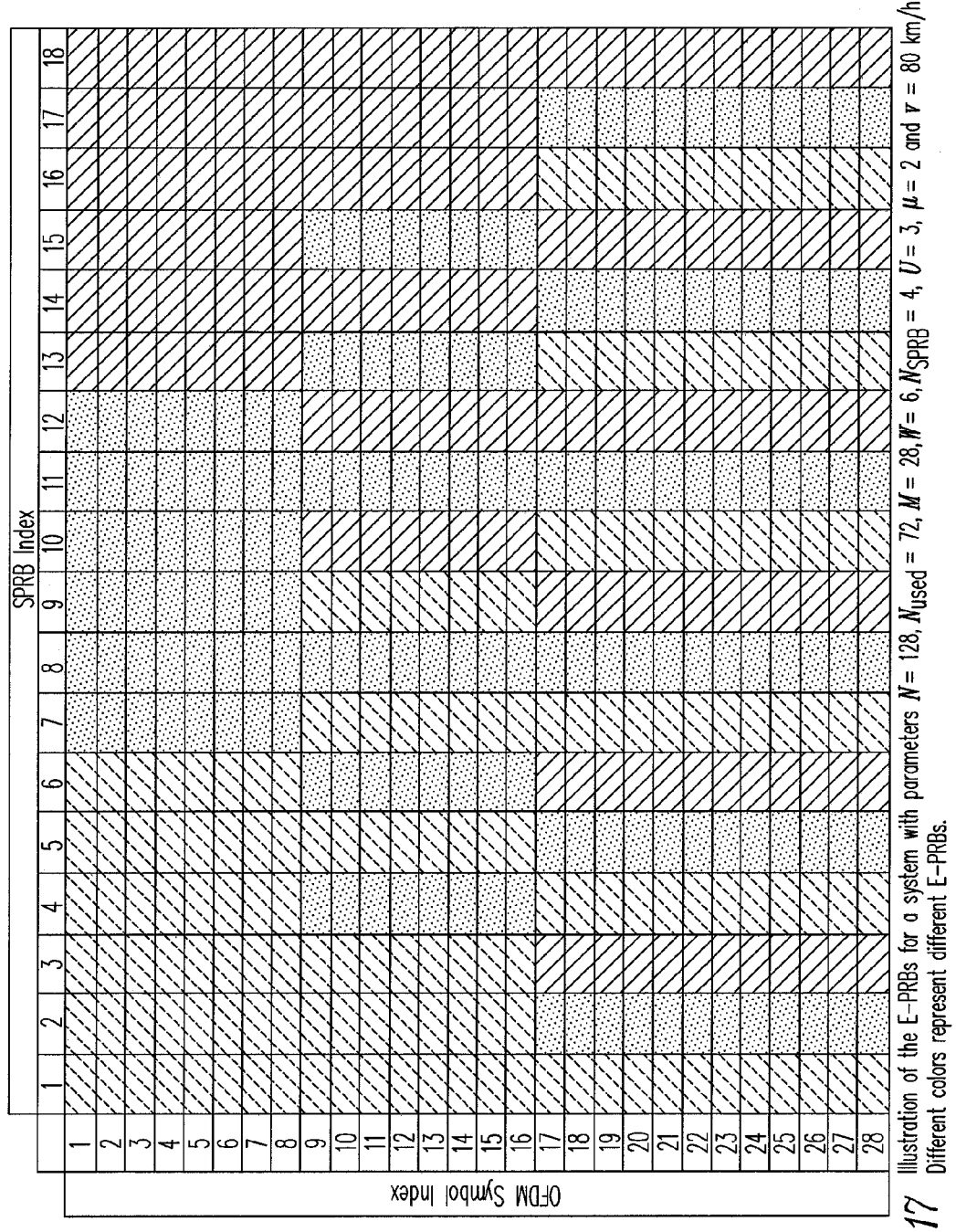
FIG. 17 Illustration of the E-PRBs for a system with parameters $N = 128$, $N_{used} = 72$, $M = 28$, $W = 6$, $N_{SPRB} = 4$, $U = 3$, $\mu = 2$ and $v = 80$ km/h. Different colors represent different E-PRBs.

Illustration of the E-PRBs for a system with parameters
$N = 128$, $N_{used} = 72$, $M = 28$, $W = 6$, $N_{SPRB} = 4$, $U = 3$, $\mu = 2$ and $v = 80$ km/h.
Different colors represent different E-PRBs.

| Fig. 18A | FIG. 18B |

Key To

NON-CYCLIC EVOLVING-TYPE USER RESOURCE STRUCTURE FOR OFDMA BASED SYSTEM WITH NULL GUARD TONES

CROSS REFERENCE TO RELATED APPLICATIONS

The present application is related to and aims priority of (i) U.S. provisional patent application, entitled "A Non-Cyclic Evolving-Type User Resource Structure for OFDMA Based System with Null Guard Tones," Ser. No. 61/163,782, filed on Mar. 26, 2009, and (ii) U.S. provisional patent application, entitled "A Simplified Evolving-Type User Resource Structure for OFDMA Based System," Ser. No. 61/164,192, filed on Mar. 27, 2009. The disclosures of these U.S. provisional patent applications are hereby incorporated by reference in their entireties.

The present invention is also related to co-pending U.S. patent application ("Copending Application"), entitled "An Evolving-Type User Resource Structure/Channelization with Enhanced Diversity for OFDMA Based Time-Varying Channels," naming inventors C.-C. Chong, H. Minn, and E Watanabe, Ser. No. 12/455,268, filed on May 28, 2009. The disclosure of the Copending Application is hereby incorporated by reference in its entirety.

BACKGROUND OF THE INVENTION

1. Field of the Invention

The present invention relates to wireless communication, such as cellular networks. In particular, the present invention relates to the structure and allocation of resources in wireless communication systems, such as cellular communication systems using orthogonal frequency division multiple-access (OFDMA) signaling protocols.

2. Discussion of the Related Art

Because of its better resource resolution in the time-frequency grid, OFDMA has attracted significant attention and has been adopted in many wireless systems. The better resource resolution also provides better exploitable diversity when proper resource allocation and resource structuring schemes are adopted. Resource allocation or sub-carrier and power allocation for OFDMA systems are discussed, for example, in (i) U.S. Patent Application Publication 2005/0265223, entitled "Method and apparatus for scheduling downlink channels in an orthogonal frequency division multiple access system and a system using the same," by J.-H. Song, filed on May 13, 2005 and published on Dec. 1, 2005; (ii) U.S. Patent Application Publication 2006/0109865, entitled "Method for allocating resources in a multicarrier system and transmission apparatus using the same," by S.-Y. Park, Y.-W. Lee, S.-B. Yun, Y.-S. Kim, filed on Nov. 25, 2005 and published on May 25, 2006; (iii) U.S. Pat. No. 6,917,812, entitled "Air interface scheduler for wireless communication networks," by A. Damnjanovic, filed on Dec. 3, 2001, and issued on Jul. 12, 2005; (iv) U.S. Pat. No. 6,987,738, entitled "Method for packet scheduling and radio resource allocation in a wireless communication system," by V. G Subramanian, R. Agarwal, R. J. La, filed on Jan. 12, 2001 and issued on Jan. 17, 2006; (v) U.S. Patent Application Publication 2006/0149620, entitled "Scheduling apparatus and method in a multicarrier communication system," by C.-H. Suh, S.-H. Park, S.-H. Yoon, S.-K. Hong, Y.-K. Cho, filed on Dec. 30, 2001 and published on Jul. 6, 2006; (vi) U.S. Patent Application Publication 2008/0076438, entitled "Method for dynamic resource allocation of uplink and downlink in OFDMA/TDD cellular system," by K. H. Chang, S. J. Ko, T. H. Sun, J. H. Kim, filed on Sep. 21, 2007 and published on Mar. 27, 2008; and (vii) U.S. Patent Application Publication 2008/0043610 ("Liu"), entitled "Multi-carrier communications with group-based subcarrier allocation," by X. Li, H. Liu, H. Yin, G. Xing, E Mu, filed on Oct. 26, 2007 and published on Feb. 21, 2008. For example, Liu discloses a method for subcarrier selection in an OFDMA system, which partitions subcarriers into groups of one or more clusters of subcarriers for use in communication with the subscriber[1]. These resource allocation schemes in the prior art neither exploit multiuser diversity benefits nor take into account a time-varying channel.

[1] Subscriber is also known as mobile station (MS) or user equipment (UE).

Some prior art schemes exploit multiuser diversity using complete or partial knowledge of the channel to guide resource allocation or scheduling. Such schemes includes (i) the article, entitled "Opportunistic beamforming and scheduling for OFDMA systems," by P. Svedman, S. K. Wilson, L. J. Cimini, and B. Ottersten, published in *IEEE Trans. Commun.*, vol. 55, no. 5, May 2007, pp. 941-952; (ii) the article ("Chemaly"), entitled "Adaptive resource allocation for multiuser MIMO/OFDM networks based on partial channel state information," by R. Chemaly, K. Letaief, and D. Zeghlache, *Proc. IEEE GLOBECOM* 2005, St. Louis, Mo., November 2005, pp. 3922-3926; (iii) U.S. Patent Application Publication 2007/0110003 ("Tujkovic I"), entitled "Subcarrier allocation in OFDMA with imperfect channel state information at the transmitter," by D. Tujkovic, A. Paulraj, filed on Jun. 16, 2006 and published on May 17, 2007; and (iv) U.S. Patent Application Publication ("Tujovic II"), entitled "Time domain interference averaging with multiuser diversity in OFDMA systems," by D. Tujkovic, A. Paulraj, filed on Jun. 16, 2006 and published on Jan. 3, 2008.

Such channel knowledge-based schemes are mostly applicable only to quasi-static or slow-varying channels. For example, Tujovic I fails to consider the impact of time-varying channels which deteriorate multiuser diversity gain. Tujovic I discloses a method that combines features of multiuser diversity and frequency diversity allocation schemes. The method of Tujovic I retains advantages of multiuser diversity allocation whenever possible by assigning a fraction of the available bandwidth to users in high signal-to-noise ratio (SNR) channels. Recognizing that channel state information (CSI) at the transmitter is not perfect, the system and method allocate the remaining bandwidth pseudo-randomly according to frequency diversity. Similarly, Tujovic II reduces interference between multiple users operating under multiuser diversity within a coherence bandwidth in an OFDMA system by spreading out the users' transmission symbols randomly in time within the coherence bandwidth. When transmission symbols are randomly dispersed, the variance of interference between users in the same sub-band is reduced.

Other schemes that incorporate time-variation or Doppler spread in their resource allocation include Chemaly (above) and the articles (i) "Sub-band rate and power control for wireless OFDM systems," by J. Oh and J. M. Cioffi, published in Proc. *IEEE Vehicular Technology Conference (VTC 2004-Fall)*, Los Angeles, Calif., Vol. 3, 26-29 Sep. 2004, pp. 2011-2014; and (ii) "Fair adaptive radio resource allocation of mobile OFDMA," by F.-S. Chu and K.-C. Chen, published in *Proc. IEEE Personal, Indoor and Mobile Radio Communications (PIMRC* 2006), Helsinki, Finland, September 2006, pp. 1-5. These time-variation or Doppler spread resource allocation schemes, however, require knowledge of the Doppler spread. Even with knowledge of Doppler spread, these methods still suffer from performance degradation at high mobile speeds. The mismatches between the models used in these methods and the actual channel time-correlation and the maximum Doppler shift may introduce additional degradation.

In the prior art, several resource structures or user channelization exploit diversity, such as (i) band division multiple access (BDMA) in the article "BDMA testbed-configuration and performance results," by T. Kunihiro, T. Yamaura, M. Suzuki, E. Fujita, published in *Proc. IEEE Vehicular Technology Conference, VTC Spring*, Vol. 3, 16-20 May 1999, pp. 1836-1840; (ii) interleaved frequency division multiple access (IFDMA), adaptive FDMA (AFDMA), and adaptive block division multiple access (ABDMA) in the article "Resource allocation and power control in a TDD OFDM-based system for 4G cellular networks," by P. Bisaglia, S. Pupolin, D. Veronesi, M. Gobbi, published in *Proc. IEEE Vehicular Technology Conference, VTC Spring*, Vol. 4, 7-10 May 2006, pp. 1595-1599; and (iii) non frequency scattering and hopping (NFSH), frequency scattering (FS), and frequency scattering and hopping (FSH) in the article "Performances of multicarrier system with time and frequency domain spreading for wireless communications," by Y. Teng, K. Naito, K. Mori, H. Kobayashi, published in *Proc. International Conference on Wireless Networks, Communications and Mobile Computing*, Vol. 1, 13-16 Jun. 2005, pp. 558-563.

Other examples of resource structures include (i) in WiMAX and IEEE 802.16e, distributed permutation and contiguous/adjacent permutation (see, Broadband Wireless Access: IEEE MAN standard, IEEE LAN/MAN Standards Committee IEEE 802.16e, 2005.); and (ii) in 3GPP LTE, localized and distributed type resource blocks (see, 3rd Generation Partnership Project (3GPP); Technical Specification Group Radio Access Network; Evolved Universal Terrestrial Radio Access (E-UTRA); Physical Channels and Modulation (Release 8), Doc. 3GPP TR 36.211, Version 8.4.0, September 2008).

All of the above user resource structures may be classified into two main categories: band-type (also known as localized-structure) and interleaved-type (also known as distributed-structure). In a band-type resource structure, a user is allocated a band of adjacently located subcarriers. In an interleaved-type resource structure, a user is allocated subcarriers that are (i) spread out across the entire band in use, (ii) interleaved with those of the other users, or (iii) both. In such a user resource structure, the subcarriers may be non-contiguous, or may be provided in several non-adjacent groups of contiguous subcarriers. The assigned subcarriers may also change from symbol to symbol in a systematic way across all users. Each of these user resource structures have their own advantages as well as disadvantages, depending upon application, usage, channel condition, mobility and other factors.

In an OFDMA system, multiuser diversity may be exploited by assigning to each user contiguous subcarriers (i.e., a band-type user resource structure). If a channel varies substantially within a transmission frame, a centralized OFDMA resource allocation scheme may lose most of its multiuser diversity gains as a result of the outdated or mismatched channel information used in the resource allocation at the beginning of the frame. In fact, the channel allocated to a user may well be in deep fade at a later part of the frame. In order to alleviate the effect of such an adverse deep fade, one may provide a shorter frame length, or a more frequent update (feedback) of channel information, at the cost of substantial throughput loss due to large overhead (e.g., preamble and control information, such as DL-MAP and UL-MAP). A very short frame length is therefore overhead inefficient. Alternatively, the time-varying channel effect may also be alleviated by keeping the subcarriers assigned to a user spread out over the entire band (i.e., interleaved-type). One example of an interleaved-type resource structure is provided in the article "A new ranging method for OFDMA systems," by X. Fu, Y. Li, and H. Minn, published in *IEEE Trans. on Wireless Commun.*, vol. 6, no. 2, February 2007, pp. 659-669. While an interleaved-type resource structure addresses the deep fade problem through frequency diversity, multiuser diversity gain is lost. Thus, existing user resource structures (i.e., both band-type and interleaved-type) have limited diversity exploitation capability in time-varying channels.

SUMMARY

The present invention provides a non-cyclic evolving-type user resource structure applicable for use in the uplink and the downlink of an OFDMA system with large null guard tones (e.g., a 3GPP Long Term Evolution (LTE) system). In one embodiment, the user resource structure combines the benefits of localized and distributed types of resource structures such as the one available in the current baseline 3GPP LTE (Release 8) specifications, and is especially suitable for operating in a fast time-varying channel i.e., high mobility environment.

According to another embodiment of the present invention, the non-cyclic evolving-type resource structure for an OFDMA system may be simplified to have no more than three stages: a band-type first stage, a partially evolved-type second stage and an interleaved-type third stage. Depending upon the target mobile speed (or average mobile speed in a cell) and packet length, the resource structure may even have less than three stages. Such an evolving resource structure may be implemented in a simple manner, with flexible system parameters.

The present simplification methodology proposed in this invention is applicable to both (a) evolving resource structures with cyclic expansion (e.g., a resource structure for an OFDMA system without null guard tones or with a small null guard tone (e.g., Mobile WiMAX), and (b) evolving resource structures with non-cyclic expansion (e.g., a resource structure for an OFDMA systems with large null guard tones (e.g., 3GPP LTE).

The present invention is better understood upon consideration of the detailed description below in conjunction with the accompanying drawings.

BRIEF DESCRIPTION OF THE DRAWINGS

FIG. 6 shows a basic E-PRB template for a 2.5 MHz channel bandwidth supporting up to 4 users simultaneously, according to one embodiment of the present invention.

FIG. 7 shows a basic E-PRB template for a 2.5 MHz channel bandwidth supporting up to 6 users simultaneously, according to one embodiment of the present invention.

FIG. 14 shows, in the shaded areas of all three stages, the k-th E-PRB, $2 \leq k \leq U-1$, according to one embodiment of the present invention.

FIG. 15 shows, in the shaded areas of all three stages, the first E-PRBs, i.e., k=1, according to one embodiment of the present invention.

FIG. 16 shows, in the shaded areas of all three stages, the last E-PRBs, i.e., k=U, according to one embodiment of the present invention.

FIG. 17 illustrates an example in which E-VRBs are provided in a system with parameters N=128, $N_{used}$=72, M=28, W=6, $N_{SPRB}$=4, U=3, μ=2 and v=80 km/h (i.e., $α_1$=8, $α_2$=8, α3=12), in accordance with one embodiment of the present invention.

DETAILED DESCRIPTION OF THE PREFERRED EMBODIMENTS

The Copending Application, incorporated herein by reference above, discloses an efficient diversity-exploiting user resource structure, referred to as an "evolving-type resource structure," suitable for use in fast time-varying, frequency-selective fading channel environments. Such a resource structure enjoys the advantages of both band-type and interleaved-type structures because it takes advantage of both multiuser diversity and frequency diversity in the fast time-varying channel. While this resource structure in the Copending Application is applicable to centralized, semi-distributed and distributed access schemes, and may be applied to both downlink (DL) and uplink (UL) cellular systems, such a resource structure is not applicable to an OFDMA frame structure with large null guard tones (e.g., in a 3GPP LTE system). Accordingly, the present invention provides a non-cyclic evolving-type user resource structure, which is applicable for both the UL and the DL of an OFDMA system with a large number of null guard tones.

Figure 1:
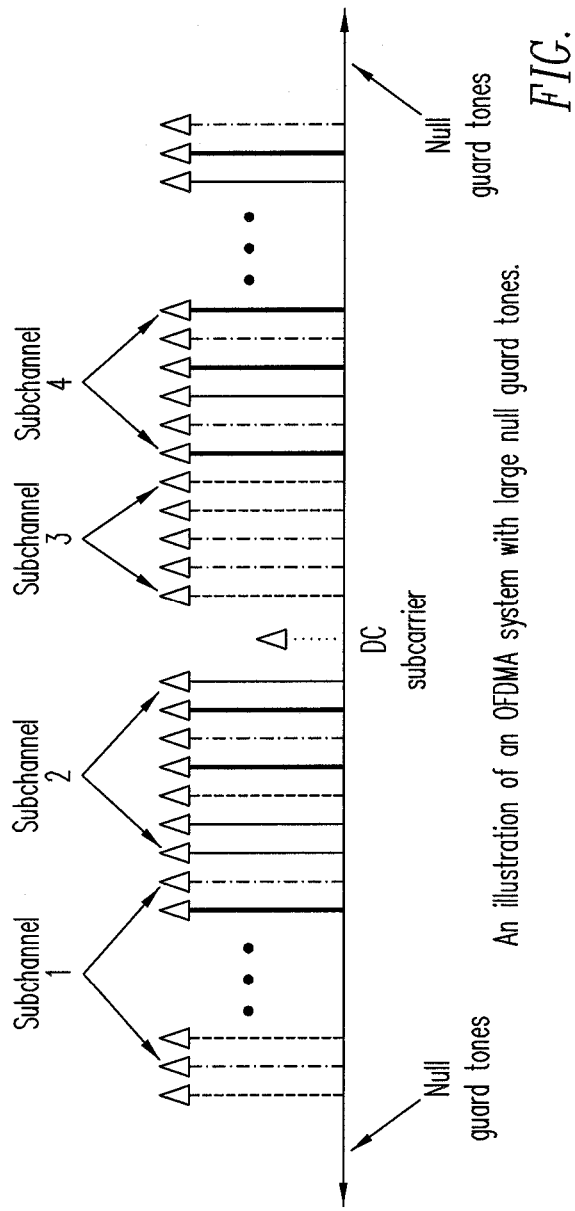
FIG. 1 illustrates an OFDMA frame structure with a large number of null guard tones.

FIG. 1 illustrates an OFDMA frame structure with null guard tones. In this detailed description, 3GPP LTE (Release 8) system parameters are used to illustrate an evolving-type resource structure of the present invention. These system parameters are summarized in Table 1:

TABLE 1

3GPP LTE Rel. 8 system parameters for OFDMA DL transmission scheme.

| Parameters | Value |
| --- | --- |
| Carrier frequency | 1.92 GHz |
| Subcarrier spacing, Δf | 15 kHz |
| Number of subcarriers per resource block, $N_{sc}^{RB}$ | 12 |
| Number of resource blocks, $N_{RB}$ | $N_{RB-min}$ = 6 |
| | $N_{RB-max}$ = 110 |
| Transmission bandwidth (MHz) | 1.25, 2.5, 5, 10, 15, 20 |
| Number of FFT size, N | 128, 256, 512, 1024, 1536, 2048 |
| Number of occupied subcarriers (including DC-subcarrier), $N_{occup}$ | 76, 151, 301, 601, 901, 1201 |
| Number of cyclic prefix samples (short) | N × 9/128 |
| Number of OFDM symbols per time slot, $N_{symb}$ | 7 (for normal CP) |
| | 6 (for extended CP) |
| Number of OFDM symbols per subframe | 14 (for normal CP) |
| | 12 (for extended CP) |
| Frame duration, $T_{frame}$ | 10 ms |
| Subframe duration, $T_{subframe}$ | 1 ms |
| Slot duration, $T_{slot}$ | 0.5 ms |

Figure 2:
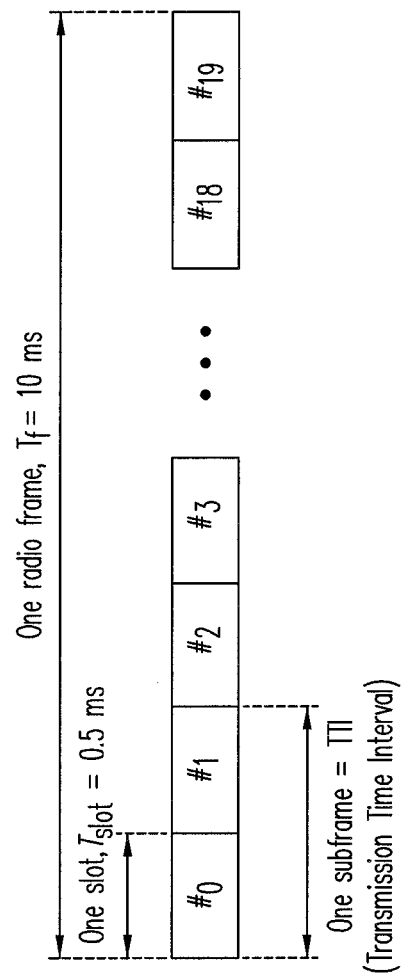
FIG. 2 shows, under 3GPP LTE, an LTE frame structure Type 1 for an FDD system.
Figure 3:
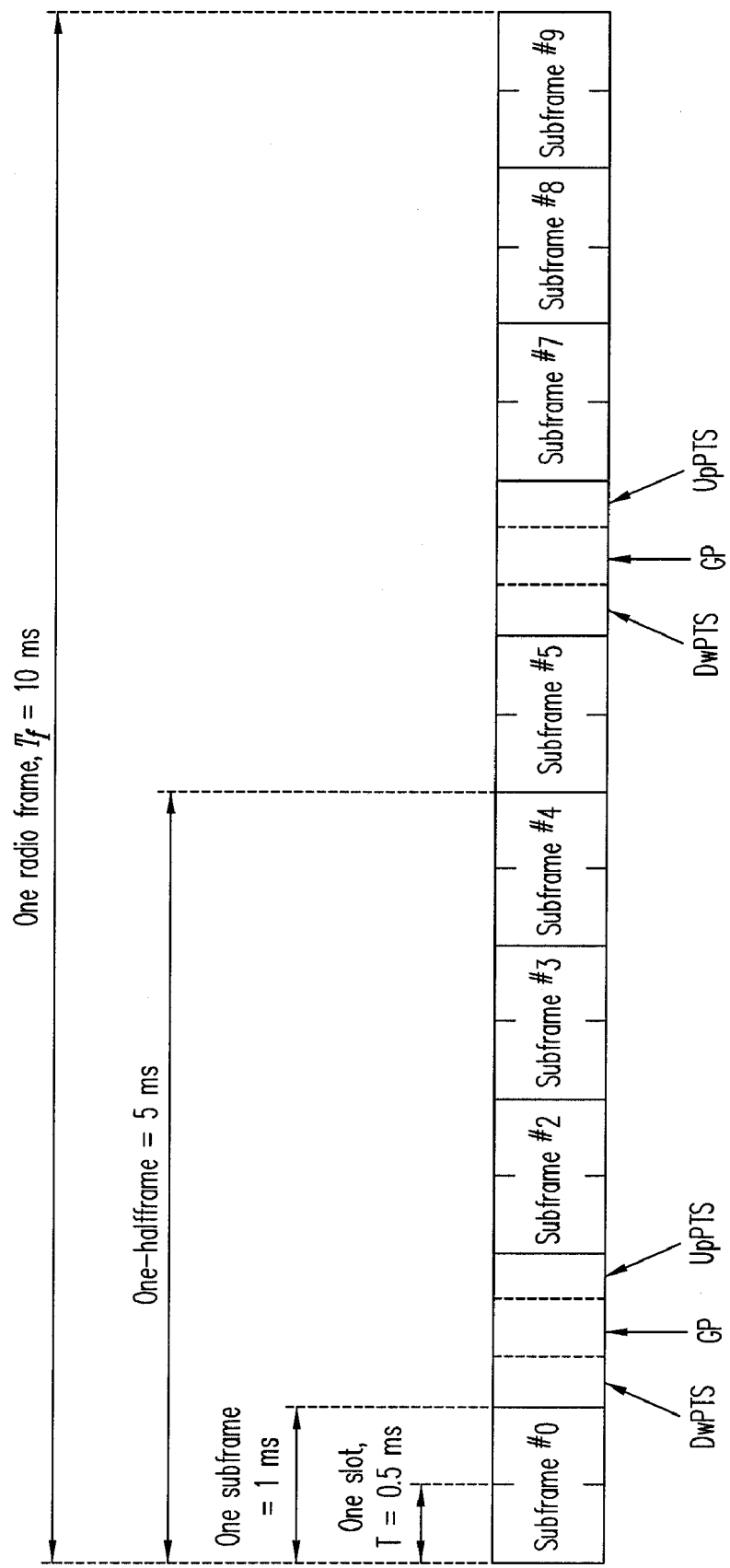
FIG. 3 shows, under 3GPP LTE, an LTE frame structure Type 2 for a TDD system.
Figure 4:
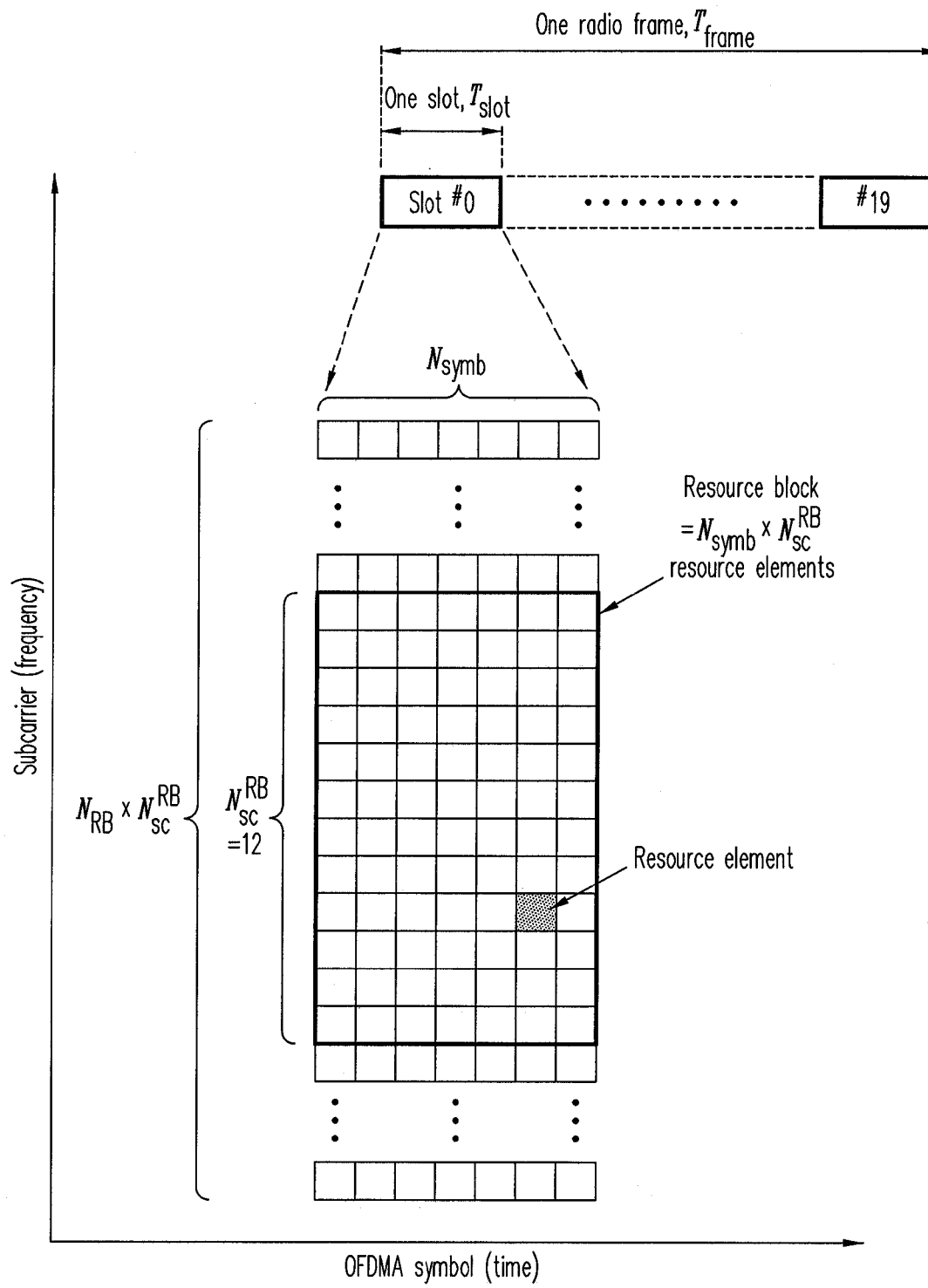
FIG. 4 shows, under 3GPP LTE, an LTE downlink resource grid.

FIGS. 2-4 show, in a 3GPP LTE system, an LTE frame structure Type 1 for a FDD system, an LTE frame structure Type 2 for a TDD system, and an LTE downlink resource grid, respectively. FIG. 4 also shows a mapping of physical channels to resource elements using resource blocks. In LTE, there are two types of resource blocks, which are referred to as "physical resource block (PRB)" and "virtual resource block (VRB)." A PRB has $N_{symb}$ consecutive OFDM symbols in the time domain and $N_{sc}^{RB}$ consecutive subcarriers in the frequency domain, where $N_{symb}$ and $N_{sc}^{RB}$ are given in Table 1 above. A PRB thus includes $N_{symb} \times N_{sc}^{RB}$ resource elements, corresponding to one slot in the time domain and 180 kHz (i.e., 12 subcarriers×15 kHz) in the frequency domain.

In the current LTE specifications, which provide that a VRB has the same size as a PRB, two types of VRBs are defined: localized-type and distributed-type. VRBs are introduced to provide distributed resource-block allocation. One embodiment of the present invention provides, in an LTE system, a third type of VRB (referred to as an evolving-type VRB or E-VRB) and an evolving-PRB or E-PRB. E-VRB and VRB differ in size and E-PRB and PRB differ in both size and structure (e.g., subcarrier locations).

Figure 5:
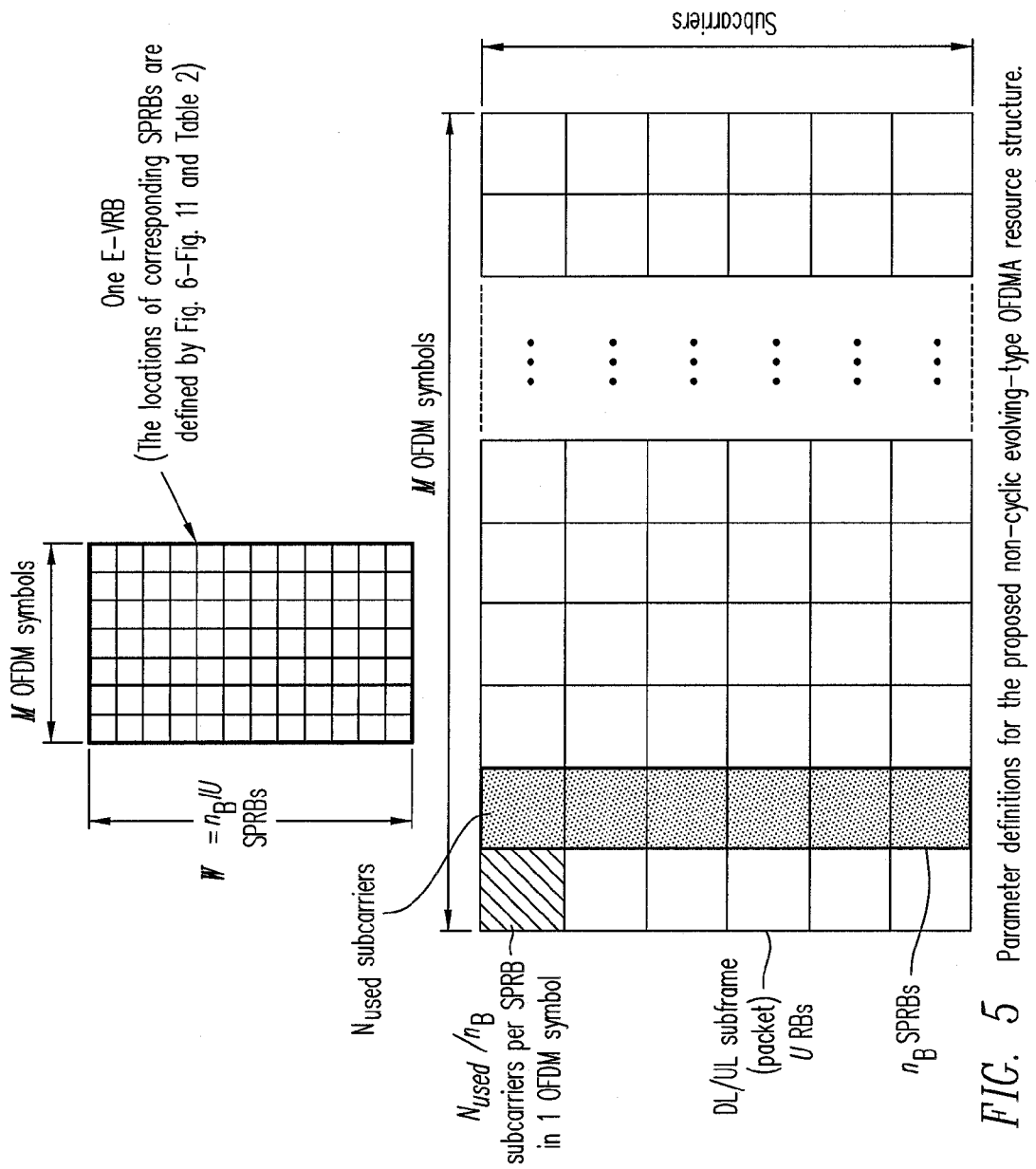
FIG. 5 illustrates the parameters definition for a non-cyclic evolving-type OFDMA resource structure, according to one embodiment of the present invention.

In this detailed description, the present invention is illustrated by a DL OFDMA system having M OFDM symbols per radio subframe and U E-VRBs over M OFDM symbols. The FFT size is N and the number of usable subcarriers is $N_{used}$ per OFDM symbol, while other subcarriers are used as null guard tones. There are $n_B$ sub-PRBs (SPRBs) per OFDM symbol, with each SPRB spanning over one OFDM symbol only, unlike the PRB in the current LTE specifications, which spans over M OFDM symbols. An SPRB plays a similar role as a PRB, however. Therefore, there are $N_{SPRB}=N_{used}/n_B$ consecutive subcarriers per SPRB (i.e., over one OFDM symbols) and $W=n_B/U$ SPRBs per symbol for each E-VRB, which spans over M symbols. This non-cyclic evolving-type OFDMA resource structure is illustrated in FIG. 5.

A E-VRB of the present invention is designed to have the following characteristics: (a) a total number of used subcarriers that is divisible by the number of subcarriers in an E-VRB, (b) the evolving resource structure spreads out in sub-block units (i.e., groups of consecutive subcarriers) or equivalently SPRBs, rather than single subcarrier; and (c) the E-VRB has reasonably large number of SPRBs. Spreading out the SPRB achieves robustness to inter-carrier interference (ICI), such as that caused by frequency offset. Accordingly, each E-VRB consists of a number SPRBs that are adjacent at the beginning of the subframe, and spreads out gradually towards the end of the subframe. Channel knowledge is assumed available at the beginning of the subframe, so that multiuser diversity can be exploited at the beginning of the subframe.

After the E-VRB is defined, the SPRB indices are associated with the E-VRB in each of the different stages. In one embodiment, five different stages are used. In the first stage, the SPRB indices are assigned according to a localized-type structure. Because of the null guard tones at the localized edges, the SPRBs of the two E-PRBs at these localized edges can each spread out only in one direction (i.e., towards the opposite edge of the applicable bandwidth), while the other SPRBs can spread out in both directions. At the last stage, the SPRBs of different E-PRBs have evolved to become distributed-type E-PRBs. The SPRB indices in each stage are preferably disjoint (i.e., no two SPRBs being assigned to the same E-VRB). FIGS. 6-11 show the basic templates of E-PRB structure for various channel bandwidths, according to the various embodiments of the present invention.

Case 1—Structure for 2.5 MHz Channel Bandwidth

FIG. 6 shows a non-cyclic E-PRB template for a 2.5 MHz channel bandwidth, according to one embodiment of the present invention. The E-VRB resulting from this case is much larger in size than the original PRB. Under the current LTE system parameters, a 2.5 MHz channel bandwidth provides 151 occupied subcarriers (including DC subcarrier which contains no data) with an FFT size N=256. Under the existing LTE, each PRB has 12 subcarriers (see, FIG. 4), and there are 12 PRBs (each spanning over 6 or 7 symbols), so that there a total of $N_{used}$=144 used subcarriers. According to this embodiment, $N_{SPRB}$=6 subcarriers per SPRB, and $n_B$=6 SPRBs per E-VRB are selected, thereby resulting in 36 subcarriers per E-VRB (i.e., 6 subcarriers per SPRB×6 SPRBs per E-VRB), which is much larger in size than the original PRB. Accordingly, 4 E-VRBs can be obtained (i.e., 144/(6×6)=4). With 4-EVRBs, 4 simultaneous users may be supported.

Case 2—Design Structure for 2.5 MHz Channel Bandwidth

FIG. 7 shows a non-cyclic E-PRB template for a 2.5 MHz channel bandwidth, in accordance with one embodiment of the present invention. In this example, $N_{SPRB}$=4 subcarriers per SPRB (i.e., support lower data rate than the SPRB of Case 1) and $n_B$=6 SPRBs per E-VRB are selected, thus providing 24 subcarriers per E-VRB (i.e., 4 subcarriers per SPRB×6 SPRBs per E-VRB). In this example, 6 E-VRBs results (i.e., 144/(4×6)=6), thus supporting up to 6 simultaneous users.

Case 3—Structure for 2.5 MHz and 5 MHz Channel Bandwidths

Figure 8B:
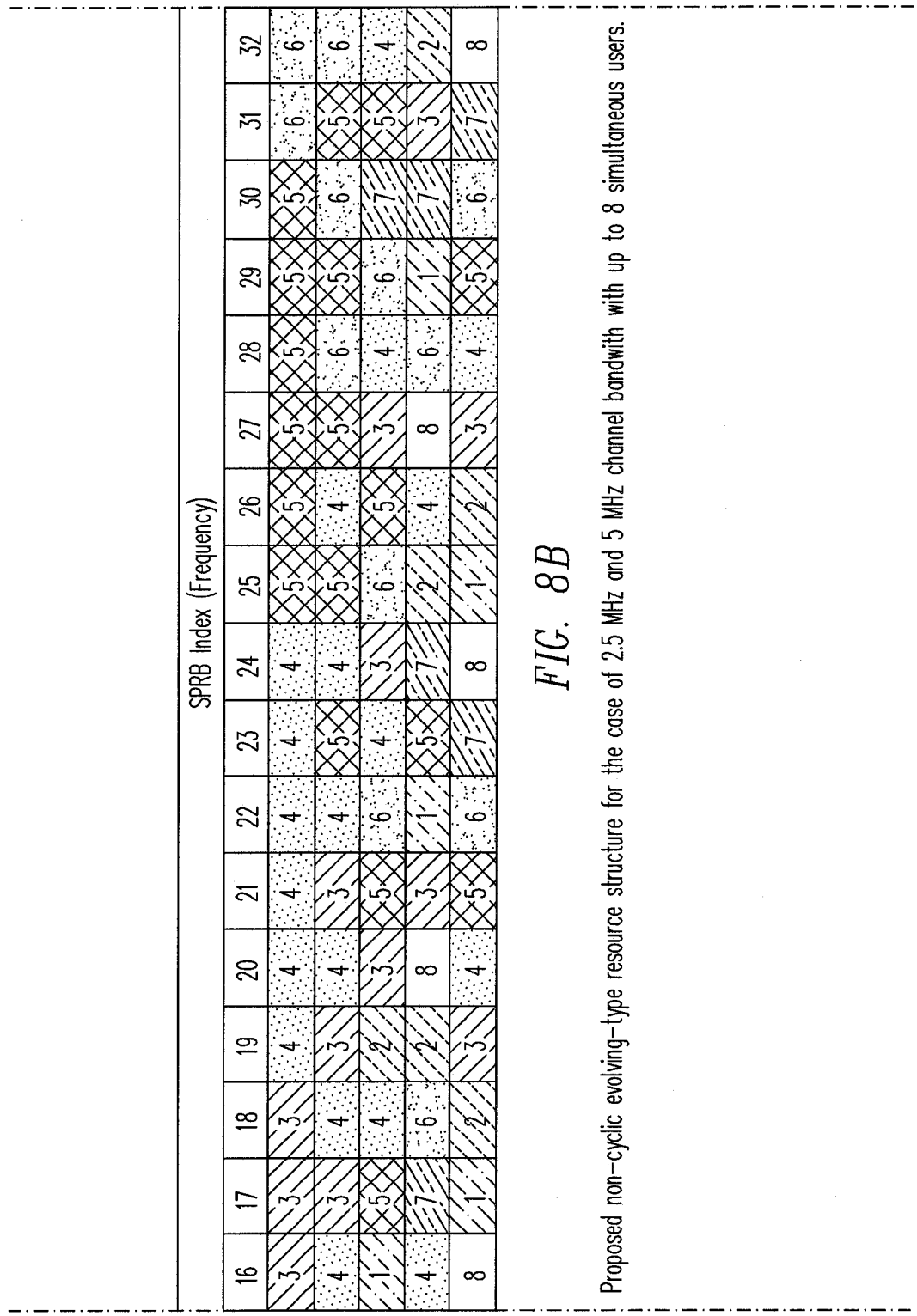
FIG. 8 shows a basic E-PRB template for 2.5 MHz and 5 MHz channel bandwidths supporting up to 8 users simultaneously, according to one embodiment of the present invention.

FIG. 8 shows an E-PRB template for 2.5 MHz and 5 MHz channel bandwidths, in accordance with one embodiment of the present invention. For a 2.5 MHz channel bandwidth, $N_{SPRB}$=3 subcarriers per SPRB (i.e., supporting a lower data rate than both Case 1 and Case 2) and $n_B$=6 SPRBs per E-VRB may be selected, to result in 24 subcarriers per E-VRB (i.e., 3 subcarriers per SPRB×6 SPRBs per E-VRB).

Under the current LTE specifications, in a 5 MHz channel bandwidth, which has 301 occupied subcarriers (including DC subcarrier which contains no data) with an FFT size N=512. Since each resource block consists of 12 subcarriers, there are 24 PRBs (each with 12 subcarriers per symbol over 6 or 7 symbols) with a total of $N_{used}$=288 used subcarriers. In this example, $N_{SPRB}$=6 subcarriers per SPRB and $n_B$=6 SPRBs per E-VRB may be selected, so as to provide 36 subcarriers per E-VRB (i.e., 6 subcarriers per SPRB×6 SPRBs per E-VRB).

Therefore, in either 2.5 MHz bandwidth or 5.0 MHz bandwidth, 8 E-VRBs may be obtained (i.e., 144/(3×6)=8 and 288/(6×6)=8) to support up to 8 simultaneous users.

Case 4—Structure for 5 MHz and 10 MHz Channel Bandwidths

Figures 9, 9A:
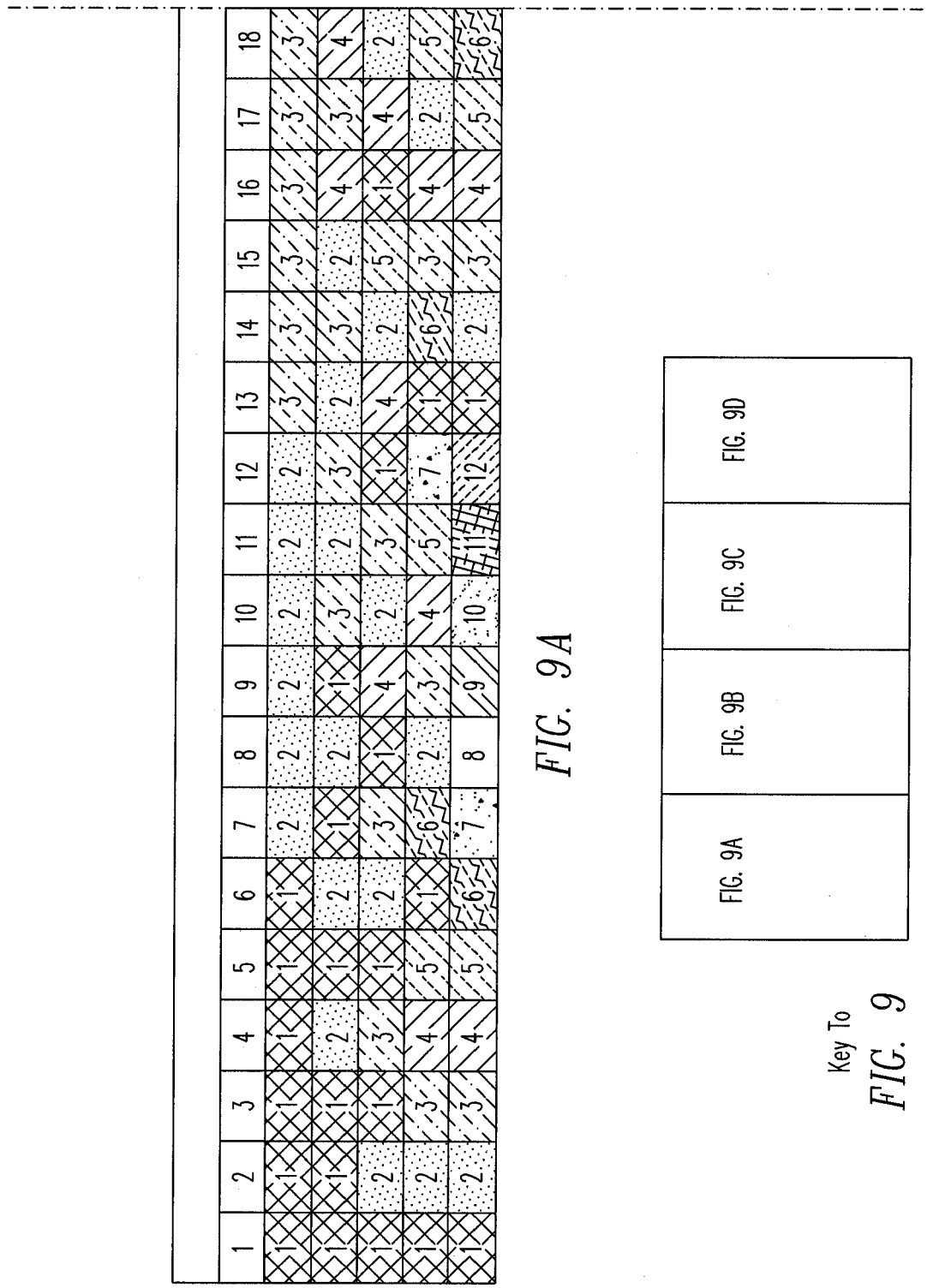
FIG. 9 shows a basic E-PRB template for 5 MHz and 10 MHz channel bandwidths supporting up to 12 users simultaneously, according to one embodiment of the present invention.
Figure 9B:
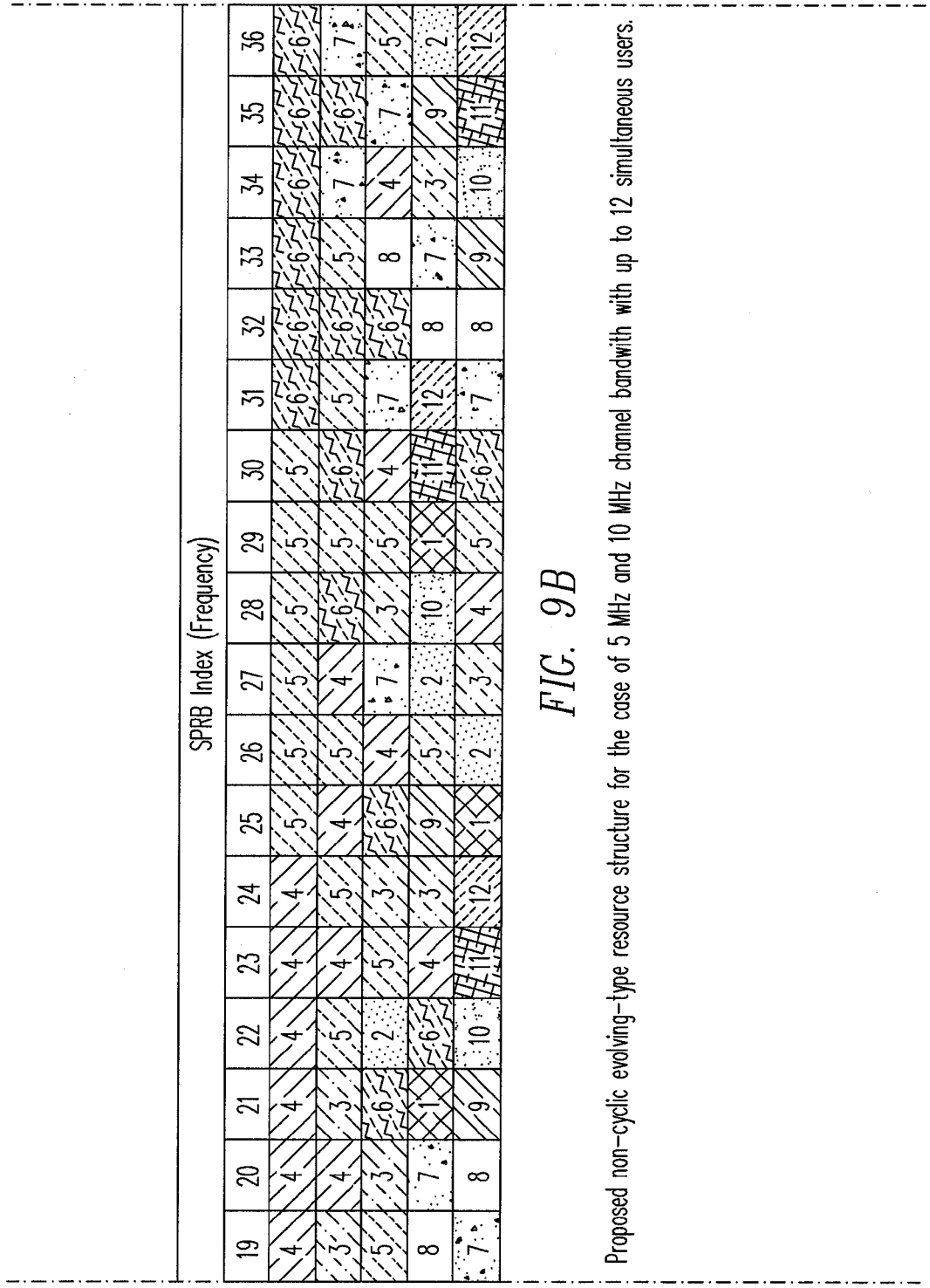
Figure 9C:
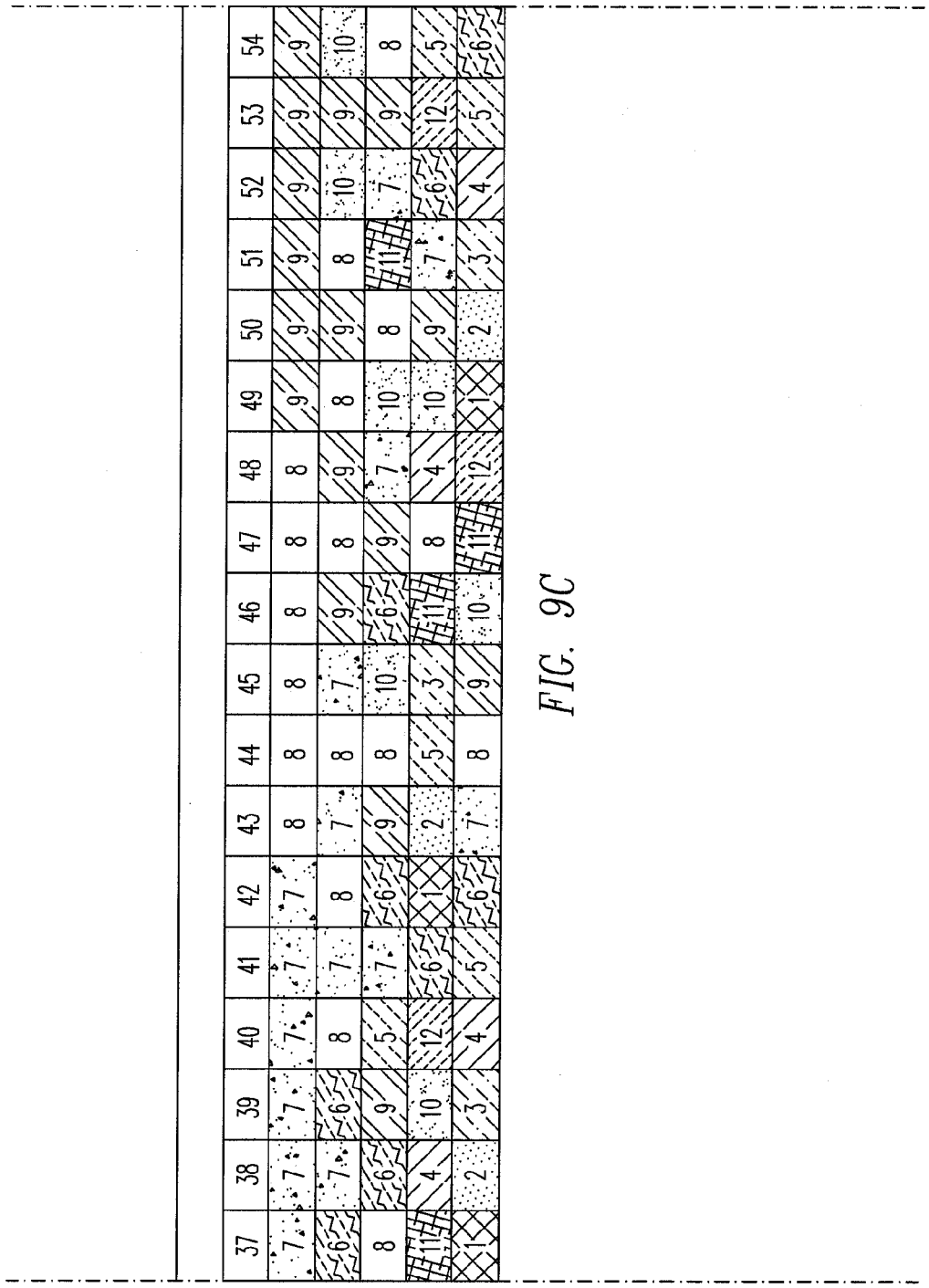
Figure 9D:
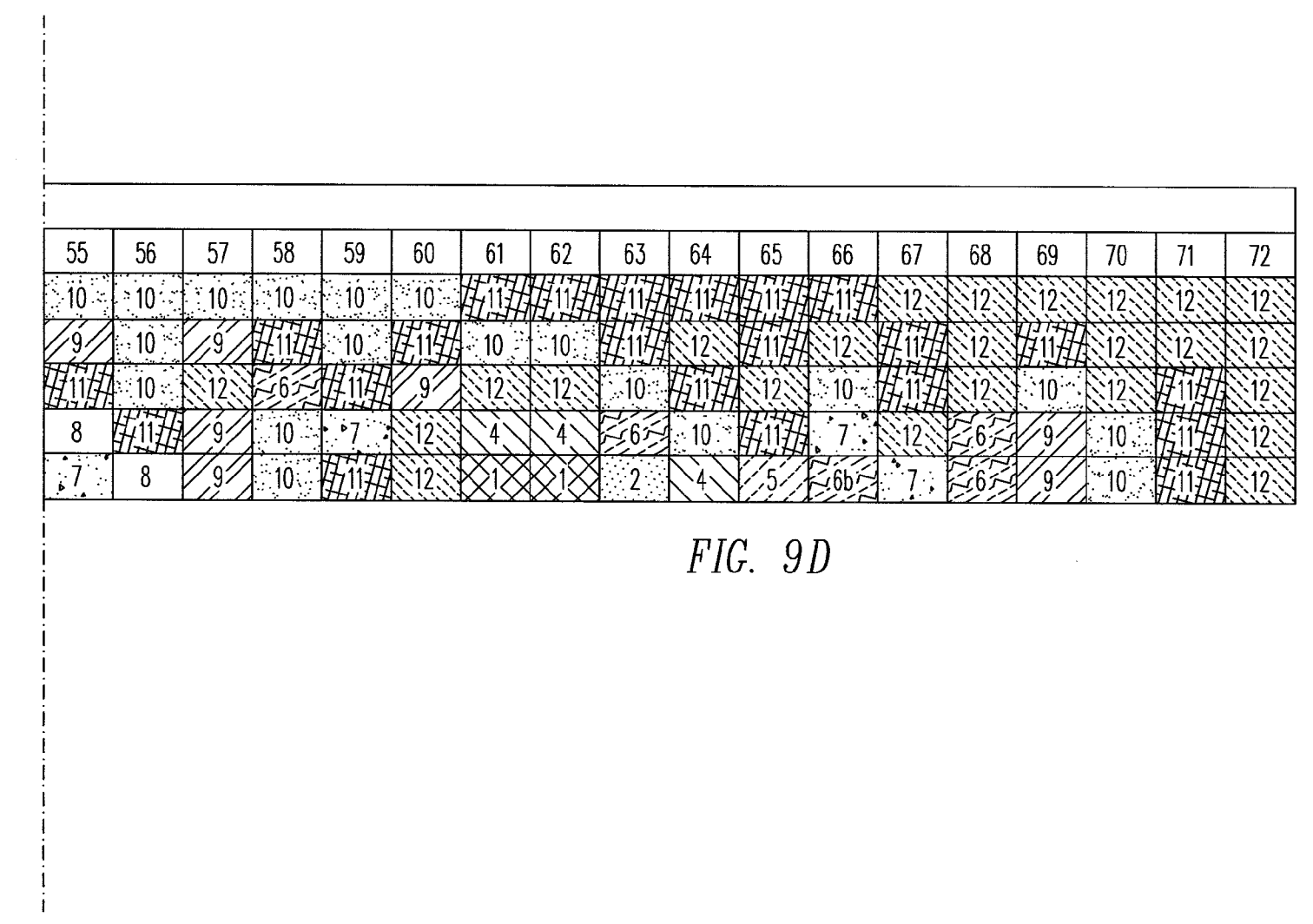

FIG. 9 shows an E-PRB template for 5 MHz and 10 MHz channel bandwidths, in accordance with one embodiment of the present invention. For a 5 MHz channel bandwidth, $N_{SPRB}$=4 subcarriers per SPRB (thus support lower data rate than Case 3) and $n_B$=6 SPRBs per E-VRB may be selected, to result in 24 subcarriers per E-VRB (i.e., 4 subcarriers per SPRB×6 SPRBs per E-VRB).

Under the current LTE specifications, for a 10 MHz channel bandwidth, there are 601 occupied subcarriers (including DC subcarrier which contains no data) with an FFT size N=1024. As each resource block consists of 12 subcarriers, there are 48 PRBs (each with 12 subcarriers per symbol over 6 or 7 symbols) with a total of $N_{used}$=576 used subcarriers. In this example, $N_{SPRB}$=8 subcarriers per SPRB and $n_B$=6 SPRBs per E-VRB are selected, to result in 48 subcarriers per E-VRB (i.e., 8 subcarriers per SPRB×6 SPRBs per E-VRB).

Therefore, under either 5 MHz or 10 MHz channel bandwidth, 12 E-VRBs may be obtained (i.e., 288/(4×6)=12 and 576/(8×6)=12), supporting up to 12 simultaneous users.

Case 5—Structure for 10 MHz Channel Bandwidth

Figure 10B:
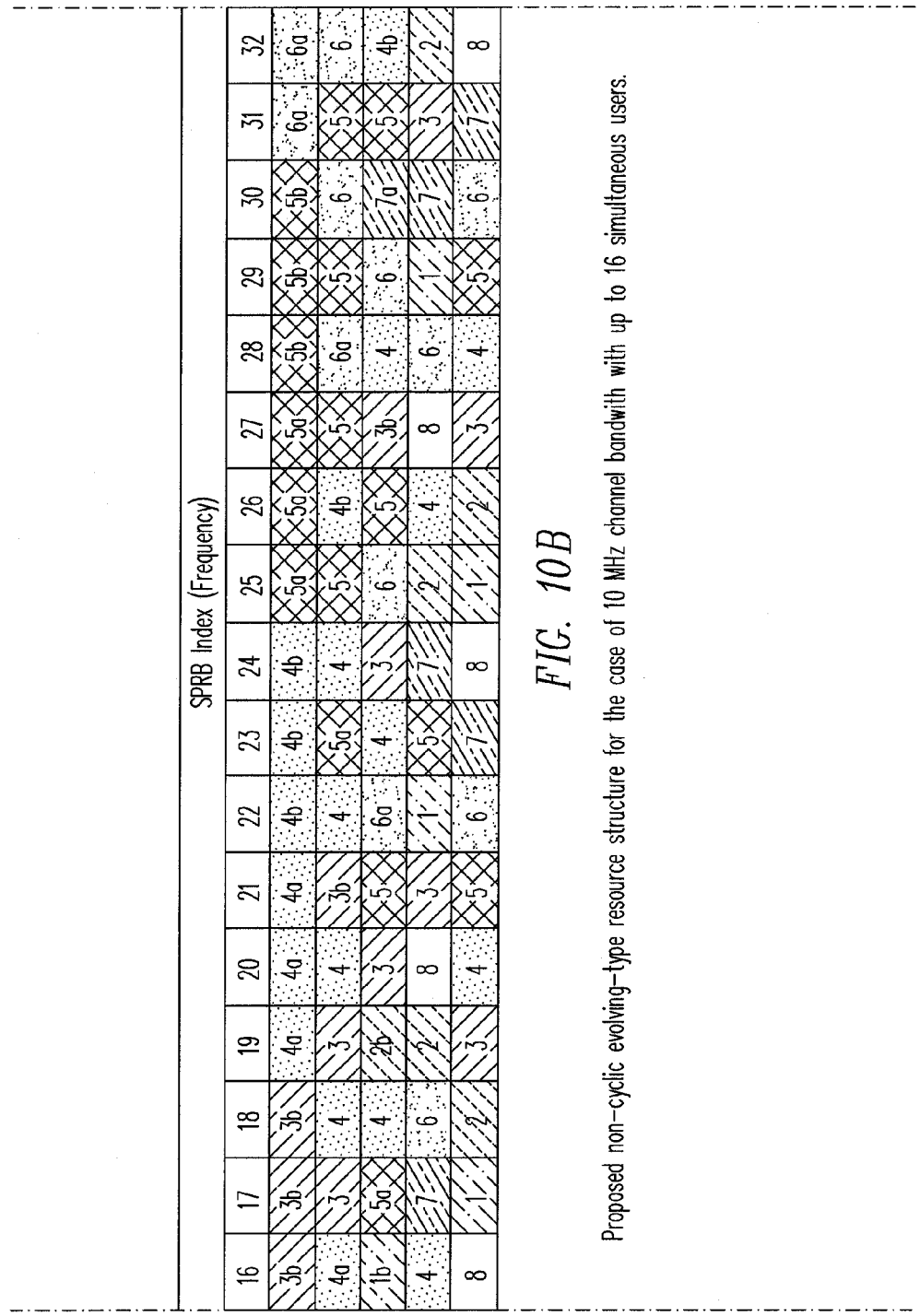
FIG. 10 shows a basic E-PRB template for a 10 MHz channel bandwidth supporting up to 16 users simultaneously, according to one embodiment of the present invention.
Figure 10C:
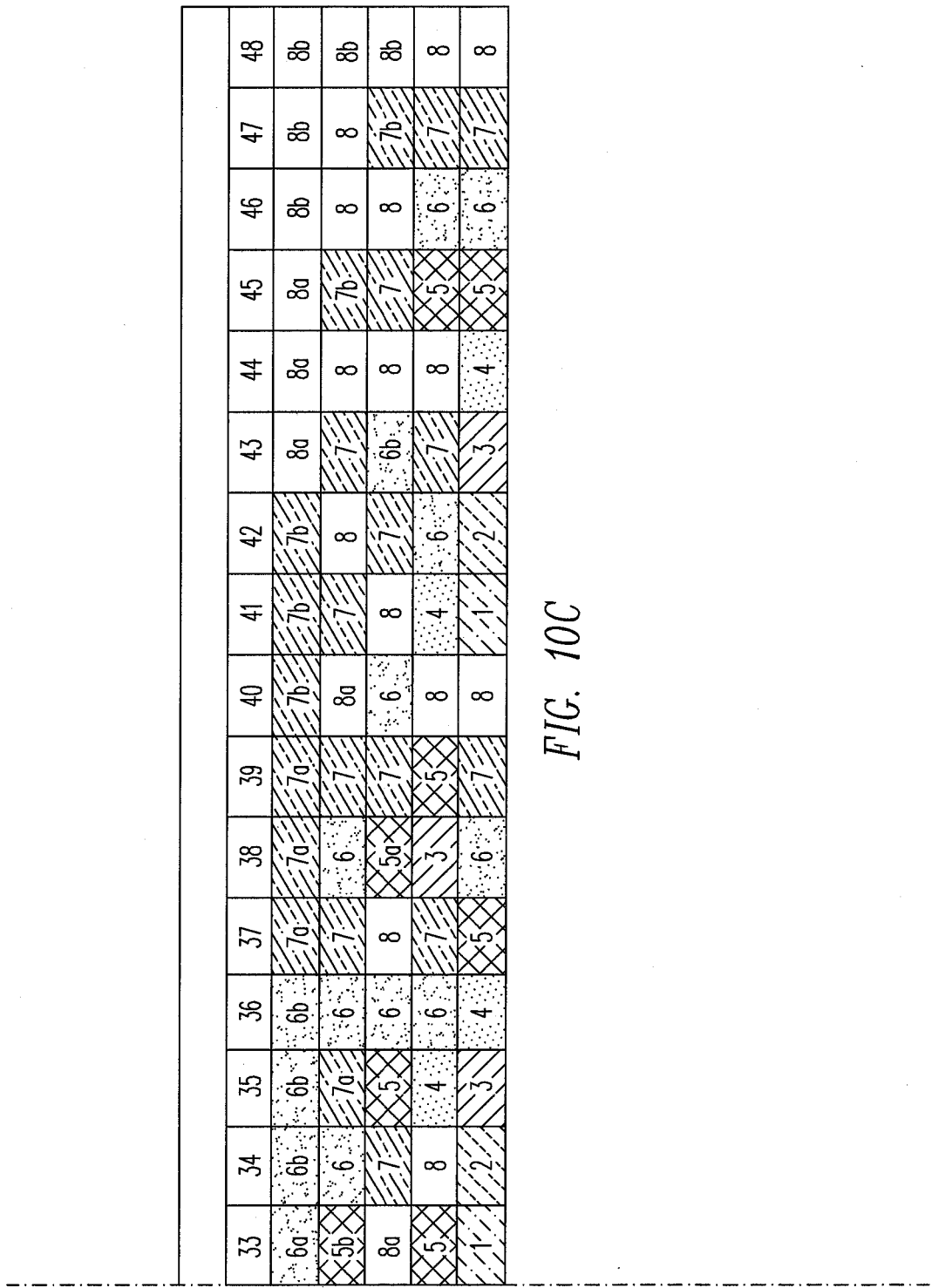

FIG. 10 shows an E-PRB template for a 10 MHz channel bandwidth, in accordance with one embodiment of the present invention. In this example, an extension to increase the available resources by using a larger FFT size can be achieved by splitting each SPRB. In this example, each SPRB may be split into two SPRBs. FIG. 10 shows, for example, SPRB "1a" and SPRB "1b" being assigned to two different E-VRBs. In this example, $n_B$=6 SPRBs per E-VRB and $N_{SPRB}$=12 subcarriers per SPRB are selected, with each SPRB having two sub-SPRB of $N_{S-SPRB}$=6 subcarriers. Accordingly, 36 subcarriers per E-VRB (i.e., 6 subcarriers per sub-SPRB×6 SPRBs per E-VRB) result. As a result, 16 E-VRBs are obtained (i.e., 576/(6×6)=16), supporting up to 16 simultaneous users.

Case 6—Structure for 10 MHz and 20 MHz Channel Bandwidths

Figure 11A:
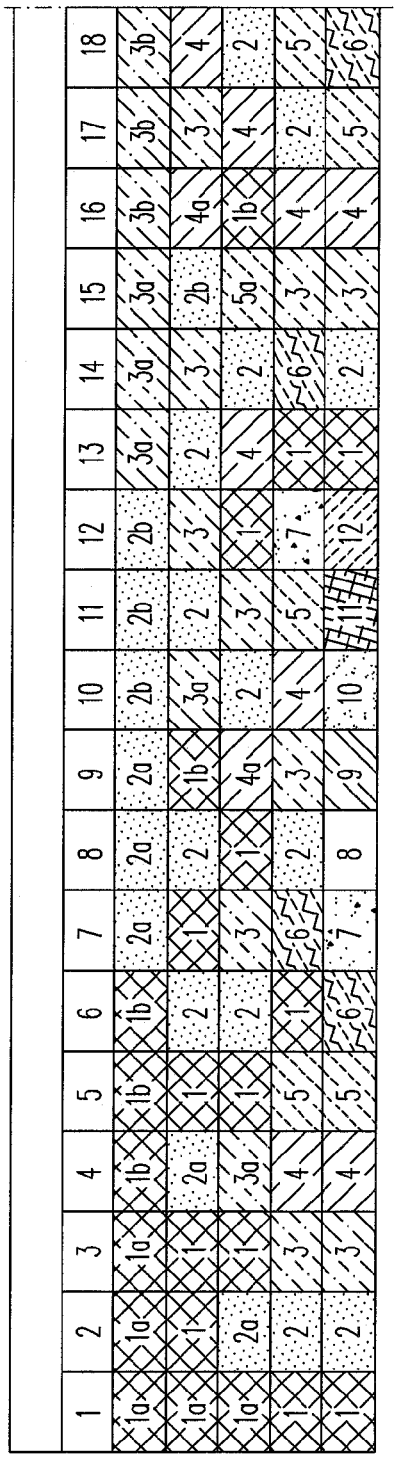
FIG. 11 shows a basic E-PRB template for 10 MHz and 20 MHz channel bandwidths supporting up to 24 users simultaneously, according to one embodiment of the present invention.
Figure 11:
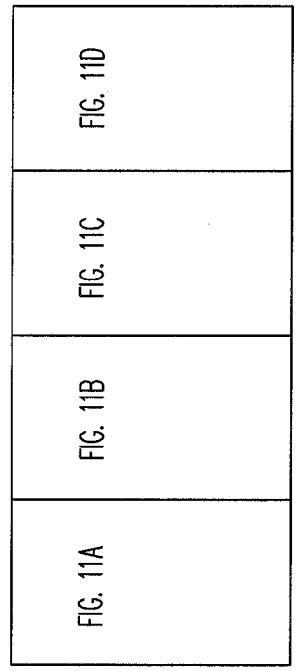
Figure 11B:
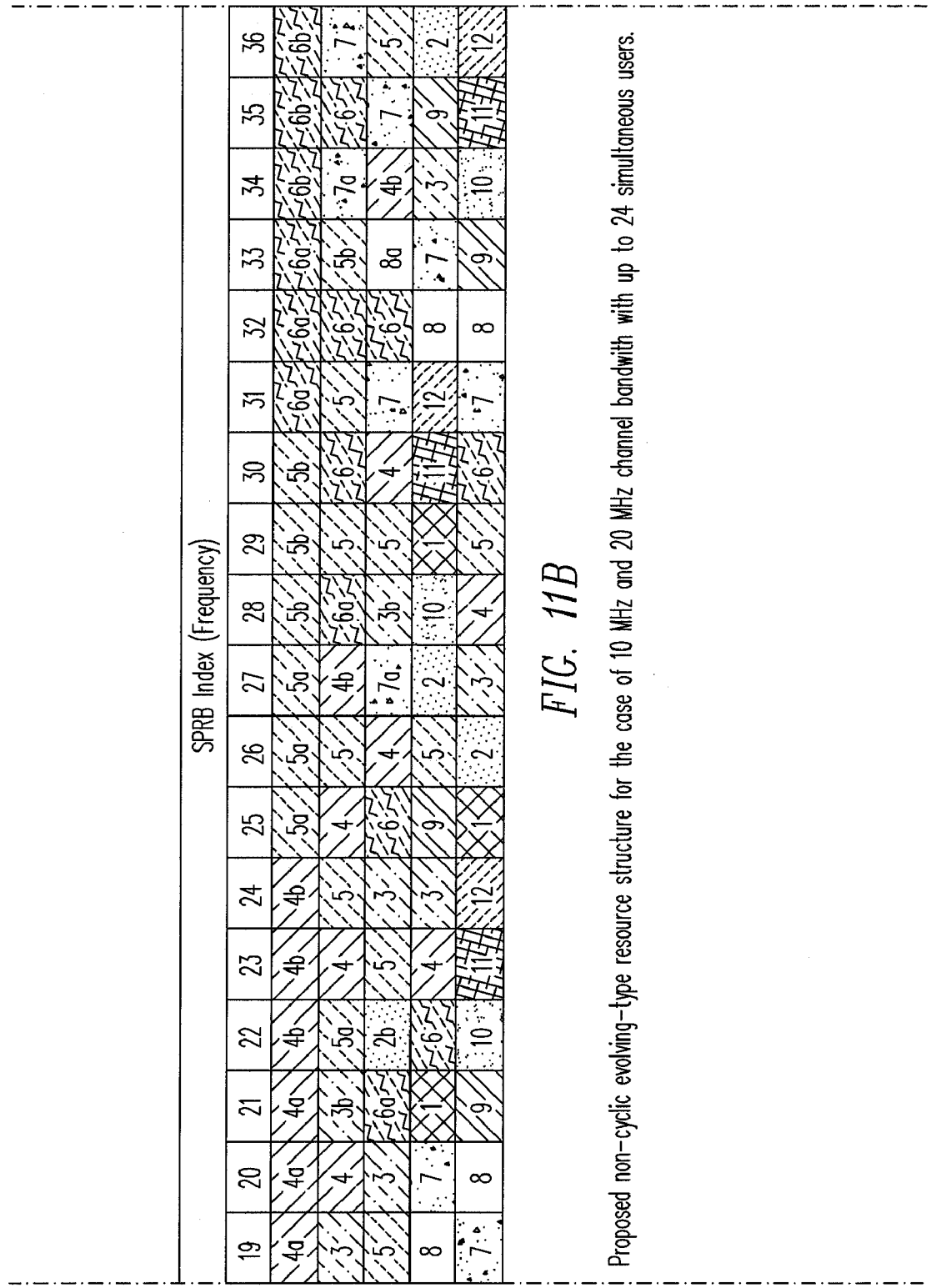
Figure 11C:
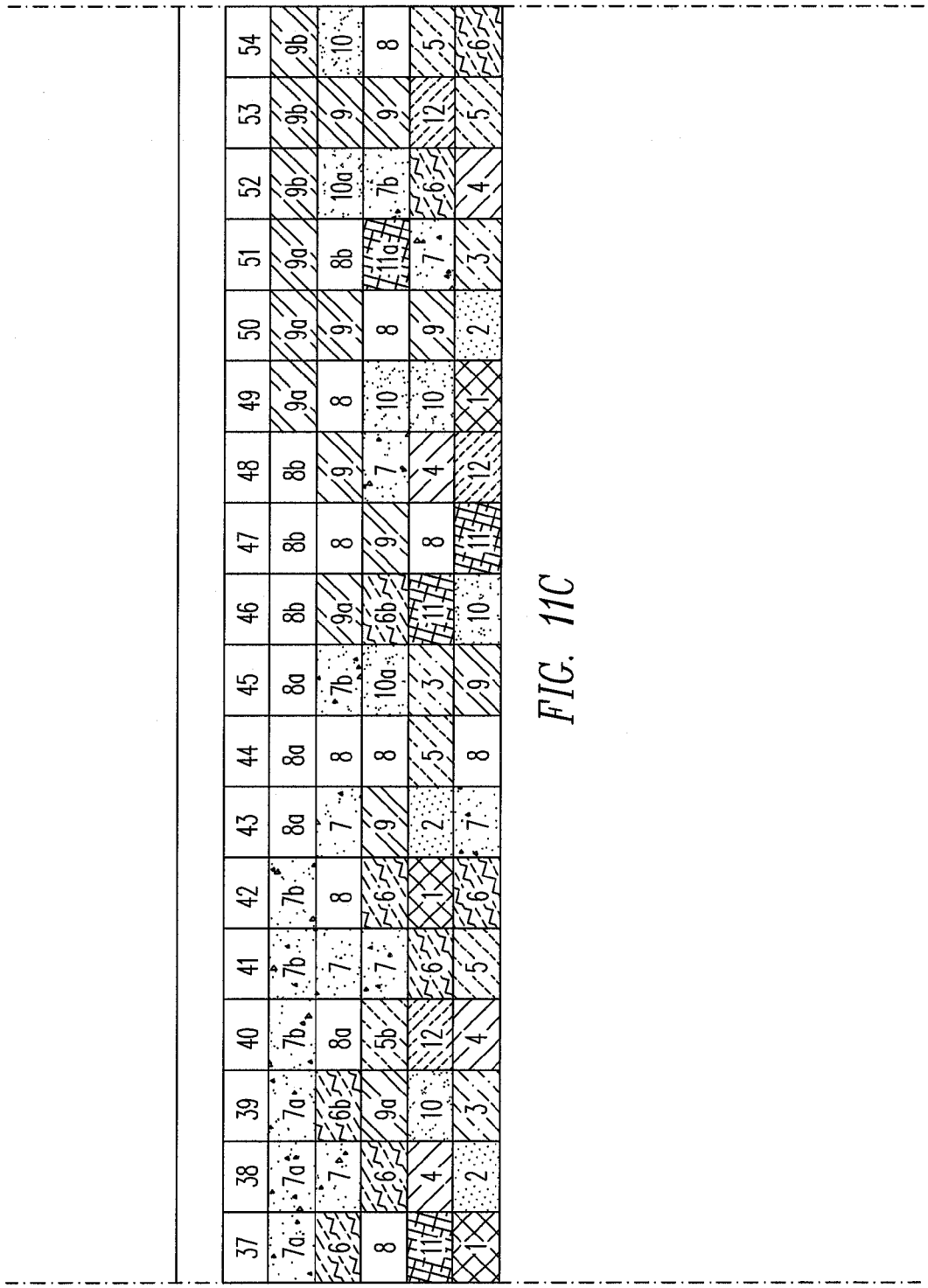
Figure 11D:
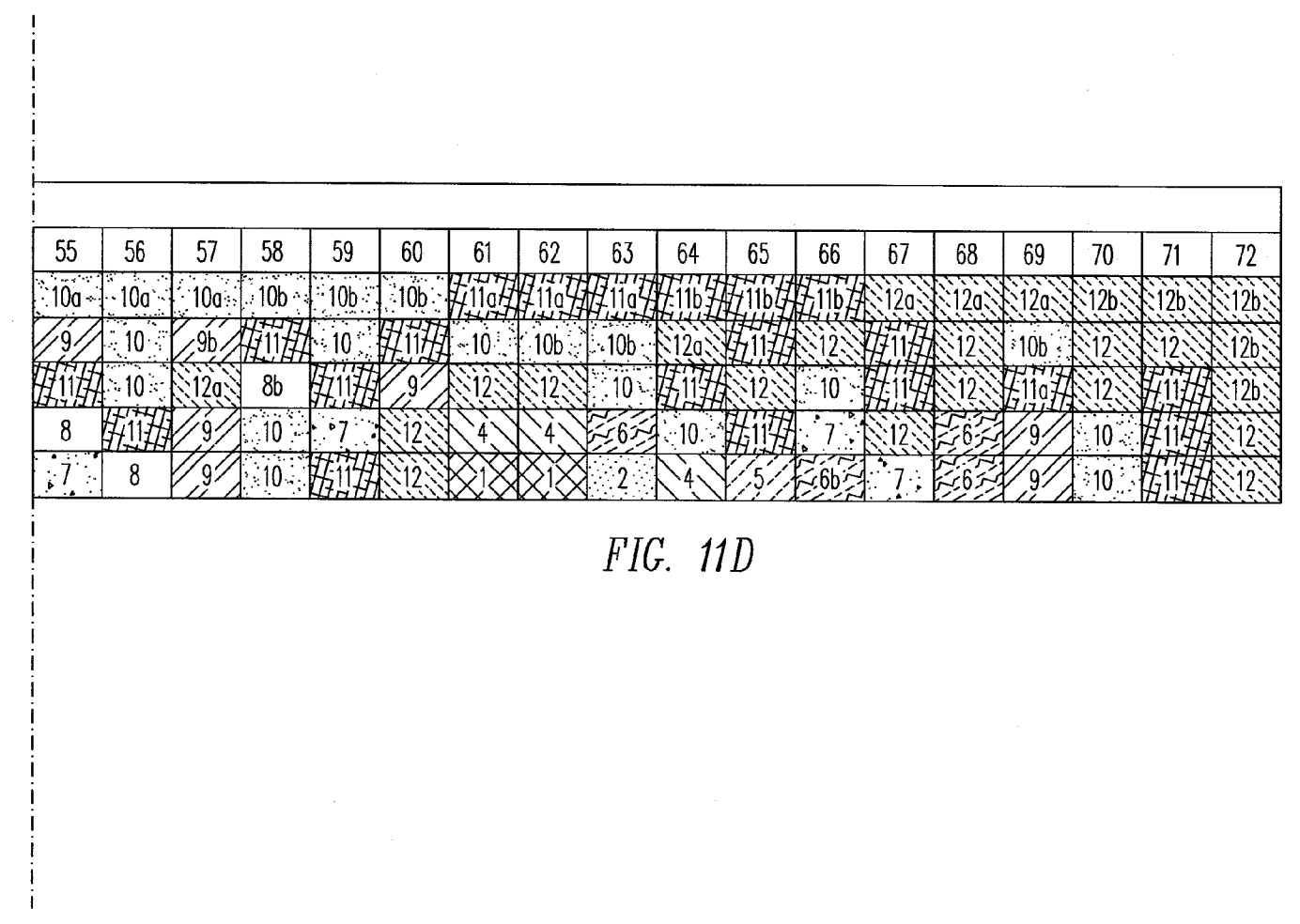

FIG. 11 shows an E-PRB template for 10 MHz and 20 MHz channel bandwidths, in accordance with one embodiment of the present invention. As in Case 5, this example also supports splitting a SPRB into sub-SPRBs. For a 10 MHz channel bandwidth, $N_{S\text{-}SPRB}=4$ subcarriers per sub-SPRB and and $n_B=6$ SPRBs per E-VRB are selected, to result in 24 subcarriers per E-VRB (i.e., 4 subcarriers per SPRB×6 SPRBs per E-VRB).

Under the current LTE specifications, a 20 MHz channel bandwidth provides 1201 occupied subcarriers (including DC subcarrier which contains no data) with an FFT size N=2048. Since each resource block consists of 12 subcarriers, there are 96 PRBs (each with 12 subcarriers per symbol over 6 or 7 symbols) with a total of $N_{used}=1152$ used subcarriers. In this example, $N_{S\text{-}SPRB}=8$ subcarriers per sub-SPRB and $n_B=6$ SPRBs per E-VRB are selected, resulting in 48 subcarriers per E-VRB (i.e., 8 subcarriers per sub-SPRB×6 SPRBs per E-VRB).

Therefore, for either the 10 MHz or the 20 MHz channel bandwidth, 24 E-VRBs are obtained (i.e., 576/(4×6)=24 and 1152/(8×6)=24), thereby supporting up to 24 simultaneous users.

After obtaining the SPRB indices of the E-PRB template of a given transmission bandwidth, the SPRB indices are mapped over M OFDM symbols. Table 2 may be used to provide the duration of each stage for each of the examples of FIGS. 6-11. The design criterion is based on the channel temporal correlation as a function of the target mobile speed. When the exact target mobile speed is not available, an estimate of average mobile speed may be obtained from the Doppler spectrum of the estimated channel.

Let μ represents the delay in OFDM symbols of CSI knowledge at the transmitter, $T_x$ be the time interval for which the channel temporal normalized correlation ρ changes from 1 to x/100, and $T_{sym}$ be the OFDM symbol duration including a cyclic prefix or a null guard interval. Let the duration of the first stage to be $T_A$ and the combined duration of all stages before the last one to be $T_B$, where A and B are design parameters. As switching from one stage to another can only occur at the symbol boundary, the durations of the stages are rounded to integer symbol units (i.e., $\alpha_i$ OFDM symbols in the $i^{th}$ stage). Let $N_1$=round $(T_A/T_{sym})$ and $N_2$=round$(T_B/T_{sym})$ (e.g., $T_A=T_{90}$ and $T_B=T_{50}$), then Table 2 provides the duration of the i-th stage of the E-PRB structure, in OFDM symbols. Note that $N_1$ and $N_2$ and hence $\alpha_i$ depend on the mobile speed—either a target mobile speed or an average mobile speed—and the system parameters (e.g., carrier frequency, symbol duration).

TABLE 2

Parameters for mapping SPRB indices over M OFDM symbols based on the target mobile speed.

| Stage | Number of OFDM symbols |
|---|---|
| 1 | $\alpha_1 = \min(M, N_1 - \mu)$ |
| 2 | $\alpha_2 = \begin{cases} 0, & \alpha_1 = M \\ \min(\text{round}((N_2 - N_1)/3), M - \alpha_1), & \alpha_1 < M \end{cases}$ |
| 3 | $\alpha_3 = \begin{cases} 0, & \alpha_2 = 0 \\ \min(\text{round}((N_2 - N_1)/3), M - \alpha_1 - \alpha_2), & \alpha_2 > 0 \end{cases}$ |
| 4 | $\alpha_4 = \begin{cases} 0, & \alpha_3 = 0 \\ \min(\text{round}((N_2 - N_1)/3), M - \alpha_1 - \alpha_2 - \alpha_3), & \alpha_3 > 0 \end{cases}$ |
| 5 | $\alpha_5 = \begin{cases} 0, & \alpha_4 = 0 \\ M - \alpha_1 - \alpha_2 - \alpha_3 - \alpha_4, & \alpha_4 > 0 \end{cases}$ |

Using Table 2, all the examples of FIG. 6-11 may be achieved in 5 stages or less. Typically, a slow mobile speed results in an evolving E-PRB structure that has less than 5 stages.

In this invention, Jakes' Doppler spectrum may be used to derived the parameters of Table 2. However, other Doppler spectra may also be used. Using Jakes's Doppler spectrum, the normalized temporal correlation function is given by $J_0$ ($2\pi f_m \tau$), where $J_0(\cdot)$ is the zero-th order Bessel function, $f_m$ is the maximum Doppler frequency, and τ is the correlation lag (time interval). Selecting $T_{90}$ for $N_1$ and $T_{50}$ for $N_2$, Table 3 shows the values of $N_1$ and $N_2$ for several mobile speeds can be obtained:

TABLE 3

Values of $N_1$ and $N_2$ based on $T_{90}$ and $T_{50}$ for different target mobile speeds.

| Mobile speed (km/h) | $N_1$ (based on $T_{90}$) | $N_2$ (based on $T_{50}$) |
|---|---|---|
| 3 | 268 | 636 |
| 20 | 40 | 95 |
| 50 | 16 | 38 |
| 80 | 10 | 24 |
| 120 | 7 | 16 |
| 200 | 4 | 10 |
| 350 | 2 | 5 |

Table 4 shows the number of OFDM symbols in each of the evolving stages for a sub-frame length of M=14 symbols and CSI delays of μ=1 and μ=2 symbols.

TABLE 4

The number of OFDM symbols used in each of the evolving stages under different target mobile speeds for M = 14, μ = 1 and μ = 2.

| | M = 14 | | | | | | | | | |
|---|---|---|---|---|---|---|---|---|---|---|
| | μ = 1 | | | | | μ = 2 | | | | |
| Mobile speed (km/h) | $a_1$ | $a_2$ | $a_3$ | $a_4$ | $a_5$ | $a_1$ | $a_2$ | $a_3$ | $a_4$ | $a_5$ |
| 3 | 14 | 0 | 0 | 0 | 0 | 14 | 0 | 0 | 0 | 0 |
| 20 | 14 | 0 | 0 | 0 | 0 | 14 | 0 | 0 | 0 | 0 |
| 50 | 14 | 0 | 0 | 0 | 0 | 14 | 0 | 0 | 0 | 0 |
| 80 | 9 | 5 | 0 | 0 | 0 | 8 | 5 | 1 | 0 | 0 |
| 120 | 6 | 3 | 3 | 2 | 0 | 5 | 3 | 3 | 3 | 0 |
| 200 | 3 | 2 | 2 | 2 | 5 | 2 | 2 | 2 | 2 | 6 |
| 350 | 1 | 1 | 1 | 1 | 10 | 0 | 1 | 1 | 1 | 11 |

Figure 12:
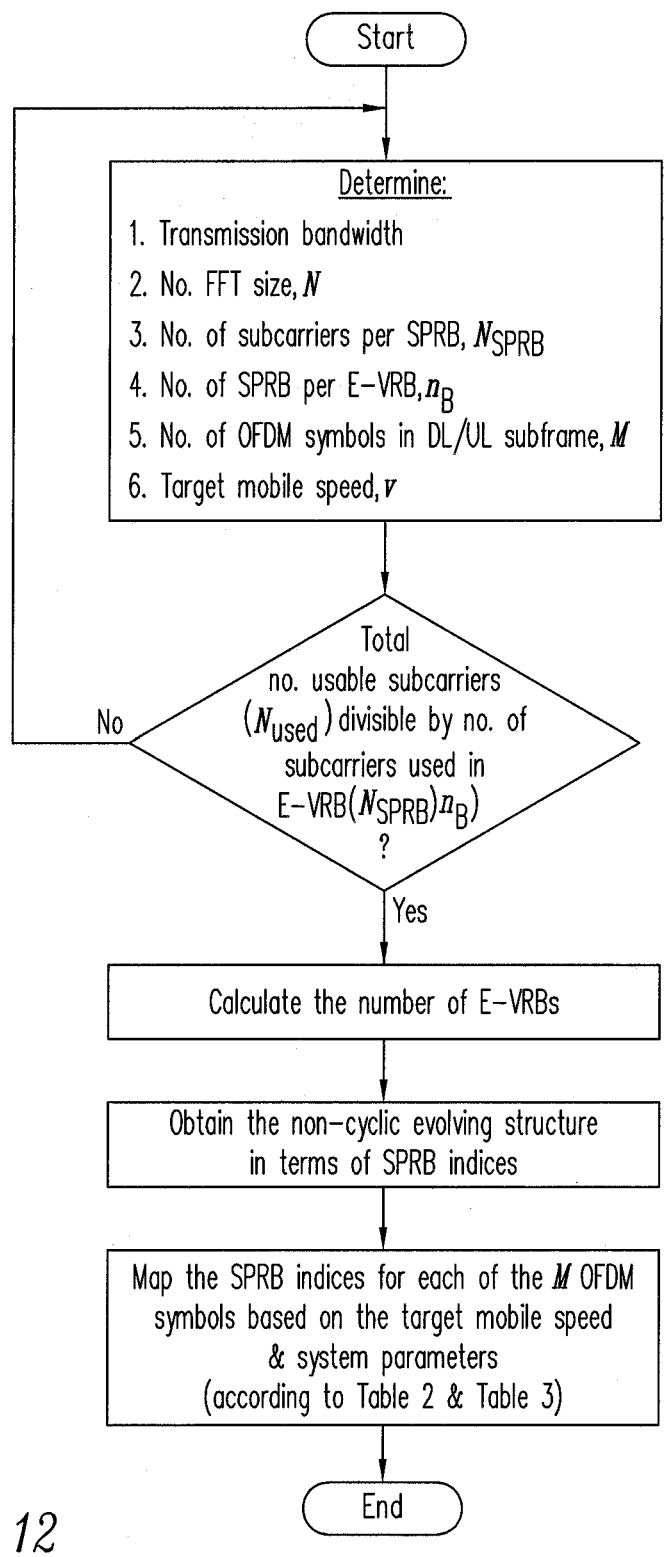
FIG. 12 is flowchart that summarizes the steps for designing a non-cyclic E-PRB structure, in accordance with one embodiment of the present invention.

FIG. 12 is flowchart that summarizes the steps for designing a non-cyclic E-PRB structure, in accordance with one embodiment of the present invention. As shown in FIG. 12, at step 1201, the following system parameters are determined: (a) transmission bandwidth, (b) an FFT size (N), (c) the number of subcarriers per SPRB ($N_{SPRB}$), (d) the number of SPRB per E-VRB ($n_B$), (e) the number of OFDM symbols (M) in a DL or UL subframe, and (f) the target or average mobile speed (v). At step 1202, using the parameters determined at step 1201, the total usable subcarriers ($N_{used}$) is tested for divisibility of the number of subcarriers in each E-VPRB (i.e., the product of $N_{SPRB}$ and $n_B$). Steps 1201 and 1202 are repeated until $N_{used}$ is divisible by the number of subcarriers in each E-VPRB. At step 1203, the number of E-VRB is calculated. The non-cyclic E-PRB structure is then determined using the SPRB indices in step 1204. In step 1205, the SPRB indices for each of the M OFDM symbols in each subframe are mapped based on the target or average mobile speed and the system parameters using, for example, Tables 2 and 3.

The E-PRB structure of the present invention provides better diversities and hence better performance over non-evolving resource structures (e.g., localized-type and distributed-type of the current LTE specifications). In addition, the present invention offers efficient exploitation of various diversities in different mobile speeds and hence different service areas. The E-PRB structure of the present invention is applicable to OFDMA systems with null guard tones, which are used in most OFDMA systems.

According to another embodiment of the present invention, an E-PRB structure simpler than the structures in the examples above is provided. Such a simpler E-PRB may be applicable for both OFDMA-based systems without null guard tones, or with a small number of null guard tones (e.g., Mobile WiMAX), and OFDMA-based systems with large null guard tones (e.g., 3GPP LTE). In the example below, the simpler E-PRB structure is illustrated by an E-PRB structure having 3 stages or less. In the first stage, the E-PRB has a band-type structure. As the transmitter acquires knowledge about channel, the band-type structure can achieve more multiuser diversity, as the resource allocation spreads out from band-type structure of the first stage. In the third (i.e., last) stage, an interleaved-type structure is achieved. Since the channel correlation is decreasing in a frame, the channel can be modeled as unknown after some symbol periods, so that an interleaved-type is suitable because of its robustness against frequency-selective deep fading. As the interleaved-type structure cannot exploit multiuser diversity, the second stage is designed to be a partially-evolved stage from the band-type to interleaved-type structure, so as to exploit partial multiuser diversity and partial frequency diversity.

According to one embodiment of the present invention, in a null-guard tones case, the allocation evolves over a single-sided spreading scheme for selected subchannels that are located on the boundary (see, for example, the E-PRB structures of FIGS. 4 and 5, to be discussed below). For the case without null guard tones, the allocation may be evolved in a wrapped around double-sided spread (i.e., cyclic manner) for all subchannels. In some case, the frame length is not long enough or the channel correlation decreases too slowly, so that the E-PRB structure does not evolve into the last stage (i.e., the evolution stops in the second stage).

Figure 13:
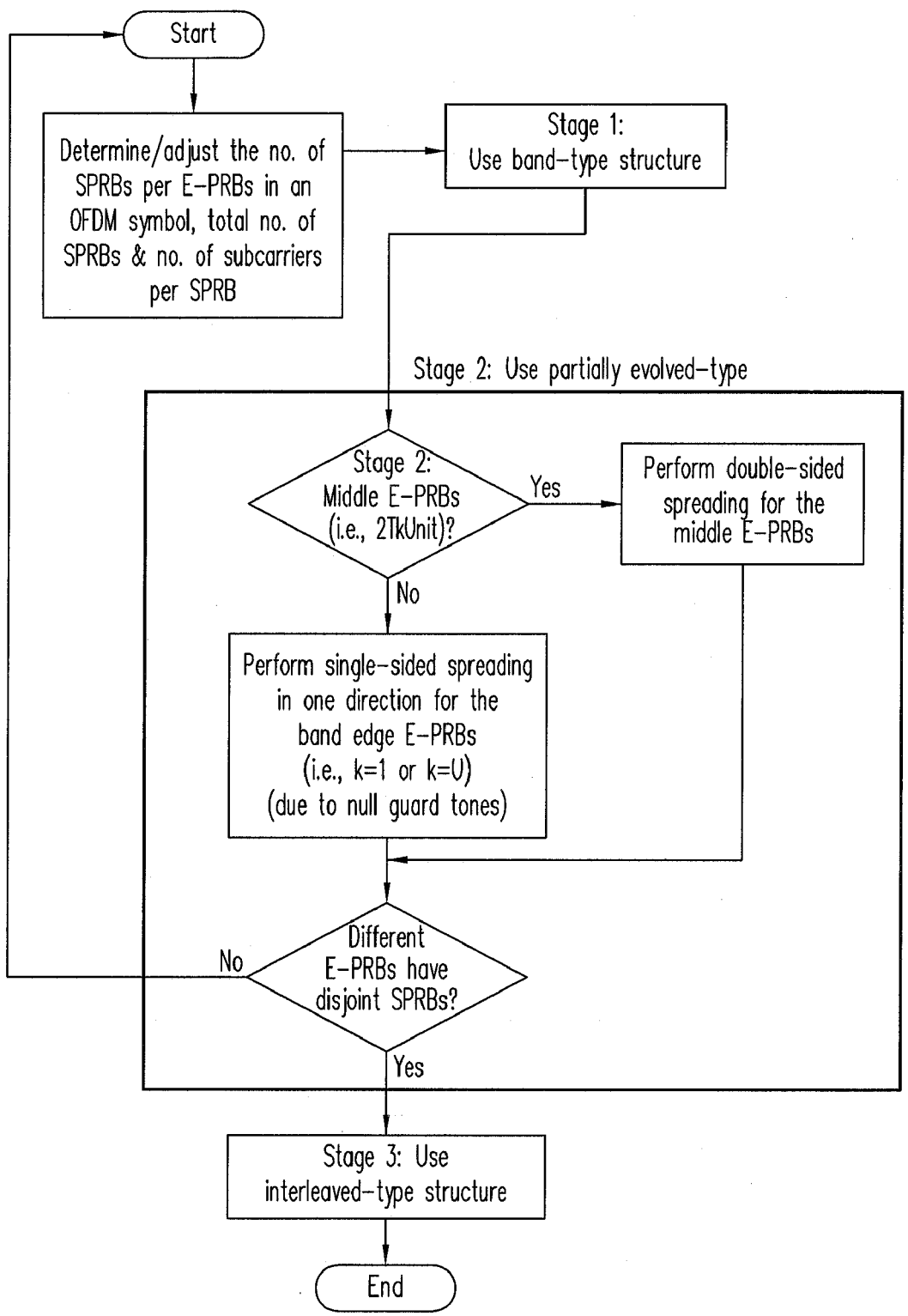
FIG. 13 is a flowchart that summarizes the designing of a 3-stage simplified E-PRB structure that can be used in a system with a large number of null guard tones, in accordance with one embodiment of the present invention.

FIG. 13 is a flowchart that summarizes the design steps for a 3-stage simplified E-PRB structure that can be used in a system with a large number of null guard tones, in accordance with one embodiment of the present invention. As shown in FIG. 13, at step 1301, the number of SPRB per E-VRB ($n_B$) in an OFDM symbol, the total number of SPRBs, and the number of subcarriers per SPRB ($N_{SPRB}$) are determined. At step 1302, a band-type VRB structure is selected. At step 1303, each E-PRB (i.e., from k=1 to k=U, where k is the index for each E-PRB) is tested if it is a middle E-PRB (i.e., $2 \leq k \leq U-1$). For a middle E-PRB, a double-sided spreading scheme is used (step 1304). Otherwise, i.e., k=1 or k=U, a single-sided spreading in one direction (step 1305). At step 1306, if the different E-PRBs in the E-PRB structure resulting from steps 1303-1305 has disjoint SPRBs, the E-PRB structure is adopted for the second stage. Otherwise, steps 1301-1306 are repeated. At step 1307, an interleaved-type VRB structure is adopted for the final stage.

Table 5 shows, for W=6 SPRBs per E-PRB, the SPRB indices of the 3-stage E-PRB template for the k-th E-PRB, $2 \leq k \leq U-1$, in a system with null guard tones.

TABLE 5

SPRB indices of the k-th E-PRB, $2 \leq k \leq U - 1$, for a system with null guard tones.

| | SPRB indices for E-PRB # k | | | | | |
|---|---|---|---|---|---|---|
| Stage 1 | 6(k − 2) + 7 | 6(k − 2) + 8 | 6(k − 2) + 9 | 6(k − 2) + 10 | 6(k − 2) + 11 | 6(k − 2) + 12 |
| Stage 2 | 6(k − 2) + 4 | 6(k − 2) + 6 | 6(k − 2) + 8 | 6(k − 2) + 11 | 6(k − 2) + 13 | 6(k − 2) + 15 |
| Stage 3 | k | k + U | k + 2U | k + 3U | k + 4U | k + 5U |

FIG. 14 shows in the shaded areas of all three stages, the k-th E-PRB, $2 \leq k \leq U-1$, according to one embodiment of the present invention.

For the first E-PRB (i.e., k=1) and the last E-PRB (i.e., k=U), the first and the third stages are defined in the same manner as the other E-PRBs (i.e., band-type and interleaved-type, respectively), but in order to maintain the same null guard tones throughout the packet, the second stage is changed through a single-sided expansion (not wrapped around at the band edge. FIGS. 15 and 16 show, in the shaded areas of all three stages, the first and the last E-PRBs, i.e., k=1 and k=U, respectively, according to one embodiment of the present invention.

Table 6 summarizes the SPRB indices of the band edge E-PRB in Stage 2 for the case of W=6 SPRBs per E-PRB:

TABLE 6

SPRB indices of the band edge E-PRBs in Stage 2 for system with null guard tones.

| | SPRB indices for the Stage 2 | | | | | |
|---|---|---|---|---|---|---|
| E-PRB # 1 | 1 | 2 | 3 | 5 | 7 | 9 |
| E-PRB # U | $n_B - 8$ | $n_B - 6$ | $n_B - 4$ | $n_B - 2$ | $n_B - 1$ | $n_B$ |

According to one embodiment of the present invention, switching from one stage to another occurs when the channel correlation falls below predefined threshold values (i.e., A and B). In this example, as in the previous examples, $T_x$ is the time interval for which the channel temporal normalized correlation ρ changes from 1 to x/100. Based on this, the switching time according to $T_A$ and $T_B$ can be obtained. FIG. 7 shows the resulting number of OFDM symbols in each stage:

TABLE 7

The number of OFDM symbols used in each stage.

| Stage | Number of OFDM symbols |
|---|---|
| 1 | $\alpha_1 = \min(M, N_1 - \mu)$ |
| 2 | $\alpha_2 = \begin{cases} 0, \alpha_1 = M \\ \min(N_2 - N_1, M - \alpha_1), \alpha_1 < M \end{cases}$ |
| 3 | $\alpha_3 = \begin{cases} 0, \alpha_1 + \alpha_2 = M \\ M - \alpha_1 - \alpha_2, \alpha_1 + \alpha_2 < M \end{cases}$ | where $\alpha_1, \alpha_2, \alpha_3$ denote the number of OFDM symbols in the first, the second and the last stages, respectively, $N_1$=round ($T_A/T_{sym}$) and $N_2$=round ($T_B/T_{sym}$) with $T_{sym}$ is the symbol duration including cyclic prefix guard intervals.

Table 8 shows, for A=90 and B=70 (i.e., $T_A=T_{90}$ and $T_B=T_{70}$), the values of $N_1$ and $N_2$ as a function of target or average mobile speed (v):

TABLE 8

Values of $N_1$ and $N_2$ based on $T_{90}$ and $T_{70}$ for different target or average mobile speeds.

| Mobile speed, v (km/h) | $N_1$ (based on $T_{90}$) | $N_2$ (based on $T_{70}$) |
|---|---|---|
| 3 | 268 | 477 |
| 20 | 40 | 72 |
| 50 | 16 | 29 |

TABLE 8-continued

Values of $N_1$ and $N_2$ based on $T_{90}$ and $T_{70}$ for different target or average mobile speeds.

| Mobile speed, v (km/h) | $N_1$ (based on $T_{90}$) | $N_2$ (based on $T_{70}$) |
|---|---|---|
| 80 | 10 | 18 |
| 120 | 7 | 12 |
| 200 | 4 | 7 |
| 350 | 2 | 4 |

Table 9 summarizes the numbers of SPRBs and E-PRBs for different transmission bandwidths of the 3GPP LTE OFDMA systems (see Table 1), according to one embodiment of the present invention.

TABLE 9

The simplified structure SPRB indices for different transmission bandwidths of the 3GPP LTE OFDMA systems.

| Transmission Bandwidth (MHz) | Number of FFT size, N | Number of used subcarriers per OFDM symbol, $N_{used}$ | Parameter Values of Simplified Evolving Structure |
|---|---|---|---|
| 1.25 | 128 | 72 | $N_{SPRB}$ = 4 subcarriers per SPRB → $n_B$ = 18 SPRBs per OFDM symbol; W = 6 SPRBs per symbol for each E-PRB → U = 3 E-PRBs |
| | | | $N_{SPRB}$ = 6 subcarriers per SPRB → $n_B$ = 12 SPRBs per OFDM symbol; W = 6 SPRBs per symbol for each E-PRB → U = 2 E-PRBs |
| 2.5 | 256 | 144 | $N_{SPRB}$ = 4 subcarriers per SPRB → $n_B$ = 36 SPRBs per OFDM symbol; W = 6 SPRBs per symbol for each E-PRB → U = 6 E-PRBs |
| | | | $N_{SPRB}$ = 6 subcarriers per SPRB → $n_B$ = 24 SPRBs per OFDM symbol; W = 6 SPRBs per symbol for each E-PRB → U = 4 E-PRBs |
| 5.0 | 512 | 288 | $N_{SPRB}$ = 4 subcarriers per SPRB → $n_B$ = 72 SPRBs per OFDM symbol; W = 6 SPRBs per symbol for each E-PRB → U = 12 E-PRBs |
| | | | $N_{SPRB}$ = 6 subcarriers per SPRB → $n_B$ = 48 SPRBs per OFDM symbol; W = 6 SPRBs per symbol for each E-PRB → U = 8 E-PRBs |
| 10 | 1024 | 600 | $N_{SPRB}$ = 4 subcarriers per SPRB → $n_B$ = 150 SPRBs per OFDM symbol; W = 6 SPRBs per symbol for each E-PRB → U = 25 E-PRBs |
| | | 612 | $N_{SPRB}$ = 6 subcarriers per SPRB → $n_B$ = 102 SPRBs per OFDM symbol; W = 6 SPRBs per symbol for each E-PRB → U = 17 E-PRBs |
| | | 576 | $N_{SPRB}$ = 6 subcarriers per SPRB → $n_B$ = 96 SPRBs per OFDM symbol; W = 6 SPRBs per symbol for each E-PRB → U = 16 E-PRBs |
| 15 | 1536 | 888 | $N_{SPRB}$ = 4 subcarriers per SPRB → $n_B$ = 222 SPRBs per OFDM symbol; W = 6 SPRBs per symbol for each E-PRB → U = 37 E-PRBs |
| | | 900 | $N_{SPRB}$ = 6 subcarriers per SPRB → $n_B$ = 150 SPRBs per OFDM symbol; W = 6 SPRBs per symbol for each E-PRB → U = 25 E-PRBs |
| | | 864 | $N_{SPRB}$ = 6 subcarriers per SPRB → $n_B$ = 144 SPRBs per OFDM symbol; W = 6 SPRBs per symbol for each E-PRB → U = 24 E-PRBs |
| 20 | 2058 | 1200 | $N_{SPRB}$ = 4 subcarriers per SPRB → $n_B$ = 300 SPRBs per OFDM symbol; W = 6 SPRBs per symbol for each E-PRB → |

TABLE 9-continued

The simplified structure SPRB indices for different transmission bandwidths of the 3GPP LTE OFDMA systems.

| Transmission Bandwidth (MHz) | Number of FFT size, N | Number of used subcarriers per OFDM symbol, $N_{used}$ | Parameter Values of Simplified Evolving Structure |
|---|---|---|---|
| | | 1224 | U = 50 E-PRBs<br>$N_{SPRB}$ = 6 subcarriers per SPRB → $n_B$ = 204 SPRBs per OFDM symbol;<br>W = 6 SPRBs per symbol for each E-PRB →<br>U = 34 E-PRBs |
| | | 1188 | $N_{SPRB}$ = 6 subcarriers per SPRB → $n_B$ = 198 SPRBs per OFDM symbol;<br>W = 6 SPRBs per symbol for each E-PRB →<br>U = 33 E-PRBs |

From Table 9, for instance, each DL or UL transmission may have 1, 2 or 4 sub-frames depending on the sub-frame assignment. With the system parameters of Table 9, the E-PRB structure may have M=14, 28, or 56 OFDM symbols. Tables 10-12 provide the number of OFDM symbols in each of the 3 evolving stages, for various sub-frames lengths and for CSI delays µ=1 and µ=2.

TABLE 10

The number of OFDM symbols used in each of the 3 evolving stages under different target mobile speeds for M = 14, µ = 1 and µ = 2.

M = 14

| | µ = 1 | | | M = 2 | | |
|---|---|---|---|---|---|---|
| Mobile speed, v (km/h) | $a_1$ | $a_2$ | $a_3$ | $a_1$ | $a_2$ | $a_3$ |
| 3 | 14 | 0 | 0 | 14 | 0 | 0 |
| 20 | 14 | 0 | 0 | 14 | 0 | 0 |
| 50 | 14 | 0 | 0 | 14 | 0 | 0 |
| 80 | 9 | 5 | 0 | 8 | 6 | 0 |
| 120 | 6 | 5 | 3 | 5 | 5 | 4 |
| 200 | 3 | 3 | 8 | 2 | 3 | 9 |
| 350 | 1 | 2 | 11 | 0 | 2 | 12 |

TABLE 11

The number of OFDM symbols used in each of the three evolving stages under different target mobile speeds for M = 28, µ = 1 and µ = 2.

M = 28

| | µ = 1 | | | µ = 2 | | |
|---|---|---|---|---|---|---|
| Mobile speed, v (km/h) | $a_1$ | $a_2$ | $a_3$ | $a_1$ | $A_2$ | $a_3$ |
| 3 | 28 | 0 | 0 | 28 | 0 | 0 |
| 20 | 28 | 0 | 0 | 28 | 0 | 0 |
| 50 | 15 | 13 | 0 | 14 | 13 | 1 |
| 80 | 9 | 8 | 11 | 8 | 8 | 12 |
| 120 | 6 | 5 | 17 | 5 | 5 | 18 |
| 200 | 3 | 3 | 22 | 2 | 3 | 23 |
| 350 | 1 | 2 | 25 | 0 | 2 | 26 |

TABLE 12

The number of OFDM symbols used in each of the three evolving stages under different target mobile speeds for M = 56, µ = 1 and µ = 2.

M = 56

| | µ = 1 | | | M = 2 | | |
|---|---|---|---|---|---|---|
| Mobile speed, v (km/h) | $a_1$ | $a_2$ | $a_3$ | $a_1$ | $a_2$ | $a_3$ |
| 3 | 56 | 0 | 0 | 56 | 0 | 0 |
| 20 | 39 | 17 | 0 | 38 | 18 | 0 |
| 50 | 15 | 13 | 28 | 14 | 13 | 29 |
| 80 | 9 | 8 | 39 | 8 | 8 | 40 |
| 120 | 6 | 5 | 45 | 5 | 5 | 46 |
| 200 | 3 | 3 | 50 | 2 | 3 | 51 |
| 350 | 1 | 2 | 53 | 0 | 2 | 54 |

FIG. 17 illustrates an example in which E-VRBs are provided in a system with parameters N=128, $N_{used}$=72, M=28, W=6, $N_{SPRB}$=4, U=3, µ=2 and v=80 km/h (i.e., $\alpha_1$=8, $\alpha_2$=8, α3=12), in accordance with one embodiment of the present invention.

Figure 18A:
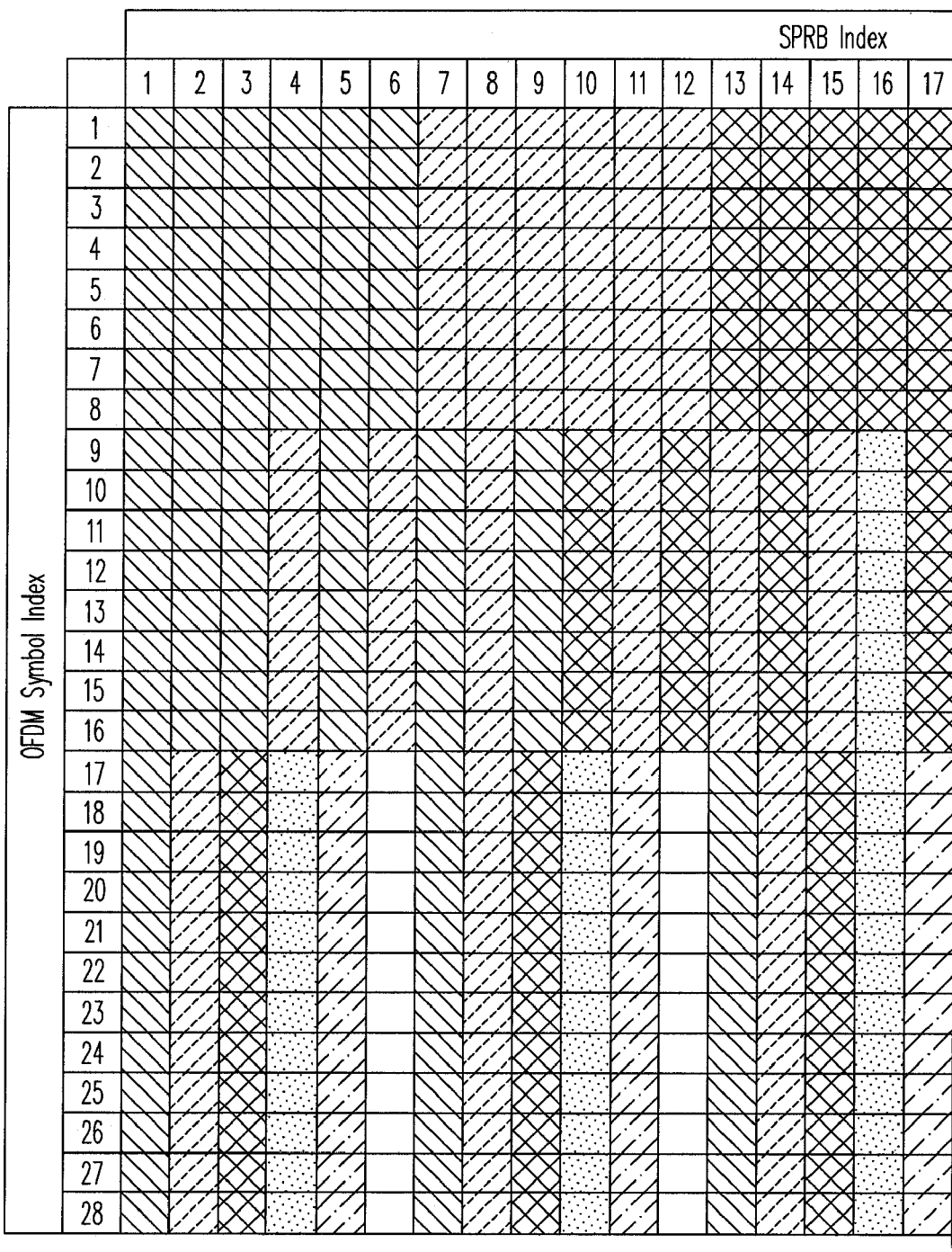
FIG. 18 illustrates an example in which E-VRBs are provided in a system with parameters N=256, $N_{used}$=144, M=28, W=6, $N_{SPRB}$=4, U=6, μ=2 and v=80 km/h (i.e., $α_1$=8, $α_2$=8, α3=12), according to one embodiment of the present invention.
Figures 18, 18B:
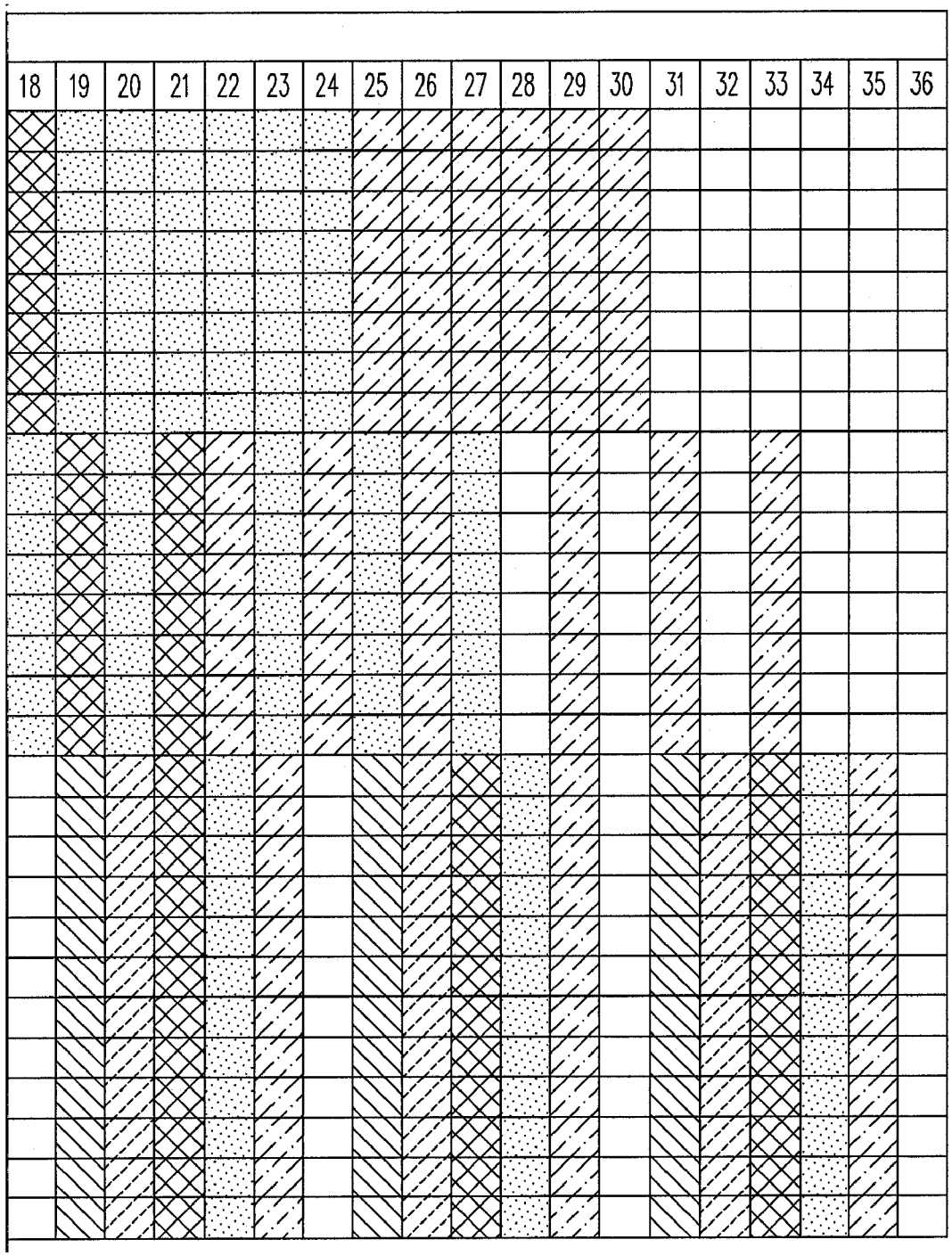

FIG. 18 illustrates an example in which E-VRBs are provided in a system with parameters N=256, $N_{used}$=144, M=28, W=6, $N_{SPRB}$=4, U=6, µ=2 and v=80 k/m (i.e., $\alpha_1$=8, $\alpha_2$=8, α3=12), according to one embodiment of the present invention.

The simplified E-PRB structure for an OFDMA system, according to the present invention, provides enhanced diversities and hence improved performance over existing non-evolving resource structures. As a result, efficient diversity exploitation for various mobile speeds and hence different service areas are achieved. This simplified design offers a much easier implementation and better flexibility to system parameters, as compared to the E-PRB structure designs of FIGS. 6-11 above for an OFDMA system, with and without null guard tones.

The above detailed description is provided to illustrate the specific embodiments of the present invention and is not intended to be limiting. Numerous modifications and variations within the scope of the present invention are possible. The present invention is set forth in the accompanying claims.

We claim:

1. A method for allocating resources in an OFDMA system downlink channel having a selected bandwidth and an FFT size, comprising:
within a network node in the OFDMA system:
determining a number of usable subcarriers, excluding null guard tones, within the bandwidth of the OFDMA system for each symbol interval, the usable subcarriers spanning contiguous block of frequencies from a first null guard band to a second null guard band;

determining a size for a sub physical resource allocation block (SPRB), each SPRB representing a predetermined number of consecutive subcarriers within the bandwidth in each symbol interval;

based on the number of usable subcarriers, determining a number of SPRBs to be associated with an evolving virtual resource block (E-VRB), each E-VRB representing the resources available for a corresponding user;

based on the number of SPRBs to be associated with each E-VRB, determining a number of E-VRBs to be used in the OFDMA system for a predetermined number of symbol intervals;

dividing the predetermined number of symbol intervals into a plurality of stages ordered successively in time;

allocating the SPRBs corresponding to the symbol intervals for a first one of the stages to the E-VRBs such that each E-VRB has contiguous SPRBs, wherein a first one of the E-VRBs is adjacent the first null guard band and a last one of the E-VRBs is adjacent the second null guard band, and wherein an intervening portion of the E-VRBs extend between the first E-VRB and the last E-VRB;

for each stage subsequent to the first one of stages, allocating the SPRBs corresponding to the symbol intervals of the stage to the E-VRBs according to increasing frequency diversity as compared to an immediately-preceding one of the stages such that the first E-VRB spreads in frequency towards the second null guard band, the intervening portions of the E-VRBs spread in frequency towards both the first and second null guard bands, and the last E-VRB spreads in frequency towards the first null guard band; and transmitting over the downlink channel corresponding users according to their E-VRBs.

2. A method as in claim 1, testing the divisibility of the usable subcarriers by a product of the number of consecutive subcarriers in an SPRB and the number of SPRBs to be associated with the E-VRB.

3. A method as in claim 2, wherein if the testing determines that the usable subcarriers is not divisible by the product of the number of consecutive subcarriers in an SPRB and the number of SPRBs to be associated with the E-VRB, redetermining the size for the SPRB and the number of SPRBs to be associated with an E-VRB.

4. A method as in claim 1, wherein during the last stage, the SPRBs in each E-VRB are distributed over the entire bandwidth.

5. The method as in claim 1, wherein the duration of each stage is determined according to a target mobile speed or an average mobile speed of a user in the OFDMA system.

6. A method as in claim 5, wherein the duration of each stage is determined according to both the target or average mobile speed and a delay in the channel state information.

7. A method as in claim 1, wherein the predetermined number of symbol intervals corresponds to a number of symbol intervals in a subframe of the OFDMA system.

8. A method as in claim 1, wherein the predetermined number of stages is 3.

* * * * *